(12) United States Patent
Hijiri et al.

(10) Patent No.: US 6,757,432 B2
(45) Date of Patent: Jun. 29, 2004

(54) APPARATUS FOR TRANSMITTING AND/OR RECEIVING STREAM DATA AND METHOD FOR PRODUCING THE SAME

(75) Inventors: Toshiki Hijiri, Moriguchi (JP); Kazuhiro Nishitani, Osaka (JP); Yoshiyuki Mochizuki, Osaka (JP); Toshiya Naka, Osaka (JP); Shigeo Asahara, Ikeda (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 10/355,887

(22) Filed: Jan. 30, 2003

(65) Prior Publication Data

US 2003/0113022 A1 Jun. 19, 2003

Related U.S. Application Data

(63) Continuation of application No. 09/356,256, filed on Jul. 16, 1999.

(30) Foreign Application Priority Data

Jul. 17, 1998 (JP) .......................................... 10-203007

(51) Int. Cl.[7] .......................... G06K 9/00; G06K 9/36; G06T 15/00
(52) U.S. Cl. ........................ 382/232; 382/240; 382/154; 345/419
(58) Field of Search .............................. 382/232, 166, 382/154, 236, 240, 241; 345/418, 419

(56) References Cited

U.S. PATENT DOCUMENTS

| | | | |
|---|---|---|---|
| 4,179,824 A | 12/1979 | Marsh | |
| 4,551,753 A | 11/1985 | Nishizawa et al. | |
| 4,645,459 A | 2/1987 | Graf et al. | |
| 4,849,810 A | 7/1989 | Ericsson | |
| 5,115,453 A | 5/1992 | Calderbank et al. | |
| 5,168,356 A | 12/1992 | Acampora et al. | |
| 5,742,289 A | 4/1998 | Naylor et al. | |
| 5,909,218 A * | 6/1999 | Naka et al. .................. | 345/419 |

FOREIGN PATENT DOCUMENTS

| | | |
|---|---|---|
| CN | 1116390 | 2/1996 |
| CN | 1160253 | 9/1997 |
| CN | 1170909 | 1/1998 |
| EP | 0 683 604 | 5/1995 |
| EP | 0 782 345 | 12/1996 |
| EP | 0 804 032 | 4/1997 |
| JP | 10-40418 | 2/1998 |
| JP | 10-083462 | 3/1998 |

OTHER PUBLICATIONS

Chinese Office Action dated Aug. 22, 2003.

Office Action regarding corresponding Japanese patent application No. 11–201048 dated Jan. 7, 2003.

Office Action regarding corresponding Japanese patent application No. 11–201048 dated Jul. 17, 2002.

* cited by examiner

*Primary Examiner*—Leo Boudreau
*Assistant Examiner*—Duy M. Dang
(74) *Attorney, Agent, or Firm*—Renner, Otto, Boisselle & Sklar, LLP

(57) ABSTRACT

A communication system is provided, which includes: a transmitter for transmitting multi-dimensional stream data capable of representing a CG scene; and a receiver for receiving the multi-dimensional stream data.

12 Claims, 16 Drawing Sheets

Example of a skeleton of a character
22 joints

APPARATUS FOR TRANSMITTING AND/OR RECEIVING STREAM DATA AND METHOD FOR PRODUCING THE SAME

This is a continuation of Application Ser. No. 09/356,256, filed Jul. 16, 1999.

BACKGROUND OF THE INVENTION

1. Field of the Invention

The present invention relates to an apparatus for transmitting and receiving stream data which forms a three-dimensional virtual space represented by three-dimensional computer graphics (hereinafter, referred to as three-dimensional CG or 3DCG) based on a network such as the Internet.

2. Description of the Related Art

In recent years, as the fields to which 3DCG is applicable, a virtual mall, electric commerce, and various home pages related thereto on the Internet such as a WWW (World Wide Web) have drawn attention. In particular, with the rapid development of the Internet, an environment is becoming available for easily handling 3DCG with a relatively high quality such as games and movies at home. In the conventional WWW, a machine called a server such as a personal computer and a work station is connected to a plurality of machines called clients such as personal computers. When a client requests, the client downloads data such as information of an image, a voice, a text, and an arrangement provided by the server, if required. The data is reconstructed on the client side, whereby a user can obtain required information. A communication method based on a TCP/IP (Transmission Control/Internet Protocol) is adopted for communication between the server and the client.

Conventionally, data provided by the server is mainly text data and image data. Recently, with the advancement in standardization of VRML (Virtual Reality Modeling Language), a browser of VRML, and the like, there is a tendency of transferring 3DCG data such as a shape and/or a scene.

Hereinafter, the VRML will be briefly described.

According to a conventional data format such as an image and a text as in HTML (Hyper Text Markup Language), a great amount of transfer time and transfer cost are required for transferring image data, in particular, animation data. Therefore, in the current system, there is a limit to the network traffic. In contrast, according to conventional 3DCG, visual point information and light source information including configurations are all processed by using three-dimensional data obtained by CG (Computer Graphics) data by calculation. On the receiving side, image data is generated based on three-dimensional data, and it is displayed.

With the advancement in CG technology, the quality of an image created by CG is rapidly improved. Therefore, it is becoming very efficient to transfer CG data as it is in view of a data amount.

Typically, when CG data is used, the data can be compressed at a data compression ratio of 1/100 or less, compared with the case where comparable image data is transferred. Thus, there is a tendency of standardizing a method for transferring 3DCG data through a network. As one solution, it is proposed to standardize 3 DCG data called VRML (VRML Ver. 2.0). In VRML Ver. 2.0, formats of data such as data having a configuration called a primitive, light source data, visual point data, and texture data, and a method for specifying a movement of a rigid body.

On the other hand, there is an animation technique for generating an image in real time, which has drawn attention recently in the CG field. By using an animation technique in real time, it is attempted to reproduce a real movement of a CG character particularly in CMs and movies. As an example, a complicated shape of a human is represented by a skeleton structure, and a motion amount of joints of a skeleton which change from moment to moment is defined, whereby a complicated motion can be naturally reproduced.

However, according to the conventional 3DCG modeling language on the Internet based on the VRML, a motion cannot be set in real time to a structure having a complicated shape such as a human.

Furthermore, it is impossible to transmit and receive motion data of a CG character (e.g., human) which performs real motions in real time through a network with a narrow band such as a telephone line.

SUMMARY OF THE INVENTION

A transmitter of the present invention includes a multi-dimensional stream data transmitting unit, for transmitting multi-dimensional stream data.

In one embodiment of the present invention, the transmitter includes: a multi-dimensional stream data identifying unit for classifying input data into a plurality of kinds of motion data; and a multi-dimensional stream data compressing unit for compressing the plurality of kinds of motion data on a block basis.

In another embodiment of the present invention, the multi-dimensional stream data compressing unit changes a compression ratio in accordance with the kind of the motion data.

In another embodiment of the present invention, the multi-dimensional stream data compressing unit selects a compression method in accordance with the kind of the motion data.

In another embodiment of the present invention, the multi-dimensional stream data compressing unit generates a node sequence which is time-series data, composed of at least one motion data among the plurality of kinds of motion data during a predetermined period, and extracts an arbitrary node from the node sequence to compress the plurality of kinds of motion data on a block basis.

In another embodiment of the present invention, the multi-dimensional stream data transmitting unit transmits interpolation information required for reproducing the extracted node and the node sequence.

In another embodiment of the present invention, the multi-dimensional stream data compressing unit reduces a high frequency component of the plurality of kinds of motion data to compress the plurality of kinds of motion data on a block basis.

In another embodiment of the present invention, the multi-dimensional stream data compressing unit subjects at least one motion data among the plurality of kinds of motion data to coordinate transformation to compress the plurality of kinds of motion data on a block basis.

In another embodiment of the present invention, the multi-dimensional stream data compressing unit transforms data represented by three-dimensional vector coordinates among the plurality of kinds of motion data to data represented by polar coordinates, thereby compressing the plurality of kinds of motion data on a block basis.

In another embodiment of the present invention, the multi-dimensional stream data includes header information or stream format describing data, describing a kind of the multi-dimensional stream data to be transmitted, an order of the plurality of kinds of motion data to be transmitted, and a length of the plurality of kinds of motion data to be transmitted.

In another embodiment of the present invention, the multi-dimensional stream data has time information and space information of a plurality of dimensions.

In another embodiment of the present invention, the space information of a plurality of dimensions includes position information, rotation information, and scale information.

In another embodiment of the present invention, the multi-dimensional stream data capable of representing a CG scene includes data representing a position, rotation and a scale of the CG scene.

In another embodiment of the present invention, the multi-dimensional stream data capable of representing a CG scene is multi-dimensional animation stream data.

In another embodiment of the present invention, the multi-dimensional stream data has a data portion having a plurality of channels and a header portion describing a stream data format of the data portion and, each of the plurality of channels has a plurality of pieces of information regarding a three-dimensional CG character at a certain time.

In another embodiment of the present invention, the three-dimensional CG character is capable of being represented by a hierarchical structure having at least one joint, and each of the plurality of motion data has at least one of data having a dimension of a position vector at a reference position of the three-dimensional CG character, data having a dimension of a direction vector representing a posture at the reference position, data having a dimension of an angle vector of the at least one joint and a rotation angle around the angle vector, and stream data having a dimension of a rotation angle around a local coordinates axis of the at least one joint.

In another embodiment of the present invention, the multi-dimensional stream data is a packet having a header portion and a data portion, and the header portion represents a kind of the packet, an order of the packet, and a length of the data portion.

In another embodiment of the present invention, the above-mentioned transmitter includes a multi-dimensional stream data retaining unit for retaining data compressed by the multi-dimensional stream data compressing unit in a multi-hierarchical structure, wherein the transmitter selects data retained in a certain hierarchical structure from the data retained in the multi-hierarchical structure, in accordance with a state of a transmission path through which the multi-dimensional stream data is to be transmitted and a reproduction speed at which a receiver receiving the multi-dimensional stream data reproduces the multi-dimensional stream data, and transmits the selected data.

In another embodiment of the present invention, the above-mentioned transmitter selects data at a hierarchy level, at which a reproducible data amount is the largest, from the data retained in the multi-hierarchical structure, in accordance with a state of a transmission path through which the multi-dimensional stream data is to be transmitted, and a reproduction speed at which the receiver receiving the multi-dimensional stream data reproduces the multi-dimensional stream data.

In another embodiment of the present invention, the above-mentioned transmitter further includes a multi-dimensional stream data retaining unit for retaining data compressed by the multi-dimensional stream data compressing unit in a file format of the multi-dimensional stream data.

According to another aspect of the present invention, a transmitting method includes a multi-dimensional stream data transmitting step of transmitting multi-dimensional stream data.

In one embodiment of the present invention, the above-mentioned transmitting method includes: a multi-dimensional stream data identifying step of classifying input data into a plurality of kinds of motion data; and a multi-dimensional stream data compressing step of compressing the plurality of kinds of motion data on a block basis.

In another embodiment of the present invention, the multi-dimensional stream data compressing unit changes a compression ratio in accordance with the kind of the motion data.

In another embodiment of the present invention, the multi-dimensional stream data compressing unit selects a compression method in accordance with the kind of the motion data.

In another embodiment of the present invention, in the multi-dimensional stream data compressing step, a node sequence is generated, which is time-series data, composed of at least one motion data among the plurality of kinds of motion data during a predetermined period, and extracts an arbitrary node from the node sequence to compress the plurality of kinds of motion data on a block basis.

In another embodiment of the present invention, the above-mentioned transmitting method includes the step of transmitting interpolation information required for reproducing the extracted node and the node sequence.

In another embodiment of the present invention, in the multi-dimensional stream data compressing step, a high frequency component of the plurality of kinds of motion data is reduced to compress the plurality of kinds of motion data on a block basis.

In another embodiment of the present invention, in the multi-dimensional stream data compressing step, at least one motion data among the plurality of kinds of motion data is subjected to coordinate transformation to compress the plurality of kinds of motion data on a block basis.

In another embodiment of the present invention, in the multi-dimensional stream data compressing step, data represented by three-dimensional vector coordinates among the plurality of kinds of motion data is transformed to data represented by polar coordinates, thereby compressing the plurality of kinds of motion data on a block basis.

In another embodiment of the present invention, the multi-dimensional stream data includes header information or stream format describing data, describing a kind of the multi-dimensional stream data to be transmitted, an order of the plurality of kinds of motion data to be transmitted, and a length of the plurality of kinds of motion data to be transmitted.

In another embodiment of the present invention, the multi-dimensional stream data has time information and space information of a plurality of dimensions.

In another embodiment of the present invention, the space information of a plurality of dimensions includes position information, rotation information, and scale information.

In another embodiment of the present invention, the multi-dimensional stream data capable of representing a CG scene includes data representing a position, rotation and a scale of the CG scene.

In another embodiment of the present invention, the multi-dimensional stream data capable of representing a CG scene is multi-dimensional animation stream data.

In another embodiment of the present invention, the multi-dimensional stream data has a data portion having a plurality of channels, and a header portion describing a stream data format of the data portion, and each of the plurality of channels has a plurality of pieces of information regarding a three-dimensional CG character at a certain time.

In another embodiment of the present invention, the three-dimensional CG character is capable of being represented by a hierarchical structure having at least one joint, and each of the plurality of motion data has at least one of data having a dimension of a position vector at a reference position of the three-dimensional CG character, data having a dimension of a direction vector representing a posture at the reference position, data having a dimension of an angle vector of the at least one joint and a rotation angle around the angle vector, and stream data having a dimension of a rotation angle around a local coordinates axis of the plurality of joints.

In another embodiment of the present invention, the multi-dimensional stream data is a packet having a header portion and a data portion, and the header portion represents a kind of the packet, an order of the packet, and a length of the data portion.

In another embodiment of the present invention, the above-mentioned transmitting method includes a multi-dimensional stream data retaining step of retaining data compressed by the multi-dimensional stream data compressing unit in a multi-hierarchical structure, wherein the transmitting method selects data retained in a certain hierarchical structure from the data retained in the multi-hierarchical structure, in accordance with a state of a transmission path through which the multi-dimensional stream data is to be transmitted and a reproduction speed for reproducing the multi-dimensional stream data, and transmits the selected data.

In another embodiment of the present invention, data at a hierarchy level, at which a reproducible data amount is the largest, is selected from the data retained in the multi-hierarchical structure, in accordance with a state of a transmission path through which the multi-dimensional stream data is to be transmitted, and a reproduction speed at which the receiver receiving the multi-dimensional stream data reproduces the multi-dimensional stream data.

In another embodiment of the present invention, the above-mentioned transmitting method further includes a multi-dimensional stream data retaining step of retaining data compressed in the multi-dimensional stream data compressing step in a file format of the multi-dimensional stream data.

According to another aspect of the present invention, a receiver includes a multi-dimensional stream data receiving unit for receiving multi-dimensional stream data.

In one embodiment of the present invention, the receiver includes: a multi-dimensional stream data identifying unit for identifying a data content of the multi-dimensional stream data from one of header information and stream format describing information of the multi-dimensional stream data; a multi-buffering unit for sequentially reading the multi-dimensional stream data into a plurality of multi-buffers on a block basis; and a multi-dimensional stream data decompressing unit for decompressing the multi-dimensional put in blocks on a block basis.

In another embodiment of the present invention, the multi-dimensional stream data identifying unit determines whether or not the received multi-dimensional stream data is a channel definition packet.

In another embodiment of the present invention, the multi-dimensional stream data identifying unit determines whether or not the received multi-dimensional stream data is a data packet.

In another embodiment of the present invention, in the case where the multi-dimensional stream data identifying unit determines that the received multi-dimensional stream data is a channel definition packet, the multi-dimensional stream data identifying unit identifies a time stamp, a total number of channels, and a compression ratio identifier representing a compression ratio of channel data from the received multi-dimensional stream data.

In another embodiment of the present invention, in the case where the multi-dimensional stream data identifying unit determines that the received multi-dimensional stream data is a data packet, the multi-dimensional stream data identifying unit identifies a time stamp and a total number of channels from the received multi-dimensional stream data.

In another embodiment of the present invention, the received multi-dimensional stream data contains compressed motion data and compression information.

In another embodiment of the present invention, the multi-dimensional stream data decompressing unit decompresses the compressed motion data based on the compression information.

In another embodiment of the present invention, the multi-dimensional stream data decompressing unit determines a decompression ratio based on the compression information.

In another embodiment of the present invention, the multi-dimensional stream data decompressing unit determines a decompression method based on the compression information.

In another embodiment of the present invention, in the case where the compressed motion data is generated by extracting arbitrary motion data from a plurality of motion data corresponding to a predetermined period, the multi-dimensional stream data decompressing unit recovers a plurality of motion data corresponding to the predetermined period based the extracted motion data and the compression information.

In another embodiment of the present invention, the compression information is interpolation information.

In another embodiment of the present invention, the multi-dimensional stream data decompressing unit decompresses the compressed motion data by subjecting the compressed motion data to coordinate transformation based on the compression information.

In another embodiment of the present invention, in the case where the compressed motion data is represented by polar coordinates, the multi-dimensional stream data decompressing unit decompresses the compressed motion data by converting the compressed motion data represented by polar coordinates into data represented by three-dimensional vector coordinates.

In another embodiment of the present invention, the multi-dimensional stream data has time information and space information of a plurality of dimensions.

In another embodiment of the present invention, the space information of a plurality of dimensions has position information, rotation information, and scale information.

In another embodiment of the present invention, the multi-dimensional stream data capable of representing a CG scene has data representing a position, a rotation, and a scale of the CG scene.

In another embodiment of the present invention, the multi-dimensional stream data capable of representing a CG scene is multi-dimensional animation stream data.

In another embodiment of the present invention, the multi-dimensional stream data has a data portion having a plurality of channels and a header portion describing a stream data format of the data portion, and each of the plurality of channels has a plurality of pieces of information regarding a three-dimensional CG character at a certain time.

In another embodiment of the present invention, the three-dimensional CG character is capable of being represented by a hierarchical structure having at least one joint, and each of the plurality of motion data has at least one of data having a dimension of a position vector at a reference position of the three-dimensional CG character, data having a dimension of a direction vector representing a posture at the reference position, data having a dimension of an angle vector of the at least one joint and a rotation angle around the angle vector, and stream data having a dimension of a rotation angle around a local coordinates axis of the plurality of joints.

In another embodiment of the present invention, the multi-dimensional stream data is a packet having a header portion and a data portion, and the header portion represents a kind of the packet, an order of the packet, and a length of the data portion.

In another embodiment of the present invention, the receiver indicates a compression ratio of the multi-dimensional stream data to a transmitter for transmitting the multi-dimensional stream data, in accordance with at least one of a state of a transmission path through which the multi-dimensional stream data is to be transmitted and a reproduction speed at which the receiver reproduces the multi-dimensional stream data.

According to another aspect of the present invention, a receiving method includes a multi-dimensional stream data receiving step of receiving multi-dimensional stream data.

In one embodiment of the present invention, the above-mentioned receiving method includes: a multi-dimensional stream data identifying step of identifying a data content of the multi-dimensional stream data from one of header information and stream format describing information of the multi-dimensional stream data; a multi-buffering step of sequentially reading the multi-dimensional stream data into a plurality of multi-buffers on a block basis; and a multi-dimensional stream data decompressing step of decompressing the multi-dimensional put in blocks on a block basis.

In one embodiment of the present invention, in the multi-dimensional stream data identifying step, it is determined whether or not the received multi-dimensional stream data is a channel definition packet.

In another embodiment of the present invention, in the multi-dimensional stream data identifying step, it is determined whether or not the received multi-dimensional stream data is a data packet.

In another embodiment of the present invention, in the case where the multi-dimensional stream data identifying unit determines that the received multi-dimensional stream data is a channel definition packet, in the multi-dimensional stream data identifying step, a time stamp, a total number of channels, and a compression ratio identifier representing a compression ratio of channel data are identified from the received multi-dimensional stream data.

In another embodiment of the present invention, in the case where the multi-dimensional stream data identifying unit determines that the received multi-dimensional stream data is a data packet, in the multi-dimensional stream data identifying step, a time stamp and a total number of channels are identified from the received multi-dimensional stream data.

In another embodiment of the present invention, the received multi-dimensional stream data contains compressed motion data and compression information.

In another embodiment of the present invention, the multi-dimensional stream data decompressing unit decompresses the compressed motion data based on the compression information.

In another embodiment of the present invention, in the multi-dimensional stream data decompressing step, a decompression ratio is determined based on the compression information.

In another embodiment of the present invention, in the multi-dimensional stream data decompressing step, a decompression method is determined based on the compression information.

In another embodiment of the present invention, in the case where the compressed motion data is generated by extracting arbitrary motion data from a plurality of motion data corresponding to a predetermined period, in the multi-dimensional stream data decompressing step, a plurality of motion data corresponding to the predetermined period are recovered based the extracted motion data and the compression information.

In another embodiment of the present invention, the compression information is interpolation information.

In another embodiment of the present invention, in the multi-dimensional stream data decompressing step, the compressed motion data is decompressed by subjecting the compressed motion data to coordinate transformation based on the compression information.

In another embodiment of the present invention, in the case where the compressed motion data is represented by polar coordinates, in the multi-dimensional stream data decompressing step, the compressed motion data is decompressed by converting the compressed motion data represented by polar coordinates into data represented by three-dimensional vector coordinates.

In another embodiment of the present invention, the multi-dimensional stream data has time information and space information of a plurality of dimensions.

In another embodiment of the present invention, the space information of a plurality of dimensions has position information, rotation information, and scale information.

In another embodiment of the present invention, the multi-dimensional stream data capable of representing a CG scene has data representing a position, a rotation, and a scale of the CG scene.

In another embodiment of the present invention, the multi-dimensional stream data capable of representing a CG scene is multi-dimensional animation stream data.

In another embodiment of the present invention, the multi-dimensional stream data has a data portion having a plurality of channels and a header portion describing a stream data format of the data portion and, each of the plurality of channels has a plurality of pieces of information regarding a three-dimensional CG character at a certain time.

In another embodiment of the present invention, the three-dimensional CG character is capable of being represented by a hierarchical structure having at least one joint, and each of the plurality of motion data has at least one of data having a dimension of a position vector at a reference position of the three-dimensional CG character, data having a dimension of a direction vector representing a posture at the reference position, data having a dimension of an angle vector of the at least one joint and a rotation angle around the angle vector, and stream data having a dimension of a rotation angle around a local coordinates axis of the at least one joint.

In another embodiment of the present invention, the multi-dimensional stream data is a packet having a header portion and a data portion, and the header portion represents a kind of the packet, an order of the packet, and a length of the data portion.

In another embodiment of the present invention, a compression ratio of the multi-dimensional stream data is indicated to a transmitter for transmitting the multi-dimensional stream data, in accordance with at least one of a state of a transmission path through which the multi-dimensional stream data is to be transmitted and a reproduction speed for reproducing the multi-dimensional stream data.

In another embodiment of the present invention, the multi-dimensional stream data contains motion data and voice data, the motion data has time stamp information, and the voice data has time stamp information, and the receiver reproduces the motion data and the voice data in synchronization, in accordance with the time stamp information of the motion data and the time stamp information of the voice data.

In another embodiment of the present invention, the multi-dimensional stream data contains motion data and voice data, the motion data has time stamp information, and the voice data has time stamp information, and the receiving method further comprises the step of reproducing the motion data and the voice data in synchronization, in accordance with the time stamp information of the motion data and the time stamp information of the voice data.

According to another aspect of the present invention, a recording medium capable of being read by a computer is provided, in which a program for allowing the computer to execute the above-mentioned transmitting method is recorded.

According to another aspect of the present invention, a recording medium capable of being read by a computer is provided, in which a program for allowing the computer to execute the above-mentioned receiving method is recorded.

According to another aspect of the present invention, a recording medium capable of being read by a computer is provided, in which a program for allowing the computer to execute the above-mentioned receiving method is recorded.

According to another aspect of the present invention, a communication system includes: a transmitter for transmitting multi-dimensional stream data; and a receiver for receiving the multi-dimensional stream data.

In one embodiment of the present invention, the transmitter includes one of an artificial satellite, a ground wave broadcasting station, and a wire broadcasting station, and the receiver is one of a digital TV and a set top box.

In the above-mentioned transmitter, the multi-dimensional stream data contains data capable of representing a CG scene.

In the above-mentioned transmitting method, the multi-dimensional stream data contains data capable of representing a CG scene.

In the above-mentioned receiver, the multi-dimensional stream data contains data capable of representing a CG scene.

In the above-mentioned receiving method, the multi-dimensional stream data contains data capable of representing a CG scene.

In the above-mentioned communication system, the multi-dimensional stream data contains data capable of representing a CG scene.

Thus, the invention described herein makes possible the advantage of providing an apparatus for transmitting and receiving multi-dimensional stream data, which is capable of transmitting and receiving motion data of a CG character in real time.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrative embodiments with reference to the drawings.

Embodiment 1

Hereinafter, Embodiment 1 will be described with reference to FIGS. 1 to 3.

In Embodiment 1, multi-dimensional stream data is transmitted and/or received, whereby multi-dimensional stream data is reproduced with a stable quality at a high speed. Herein, the multi-dimensional stream data may contain data representing a CG scene. The data representing a CG scene contains geometric information such as object information, light source information, and viewing point information.

Figure 1:
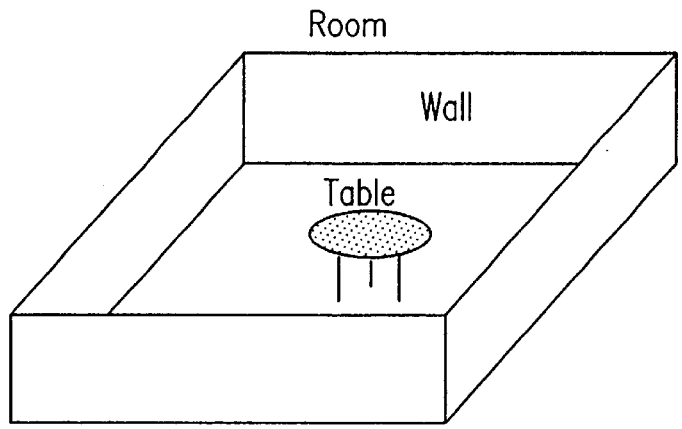
FIG. 1 shows an example of a CG scene displayed by a display device.

FIG. 1 shows an example of a CG scene displayed by a display device. FIG. 1 shows that a table is positioned in a room surrounded by a wall.

Figure 2:
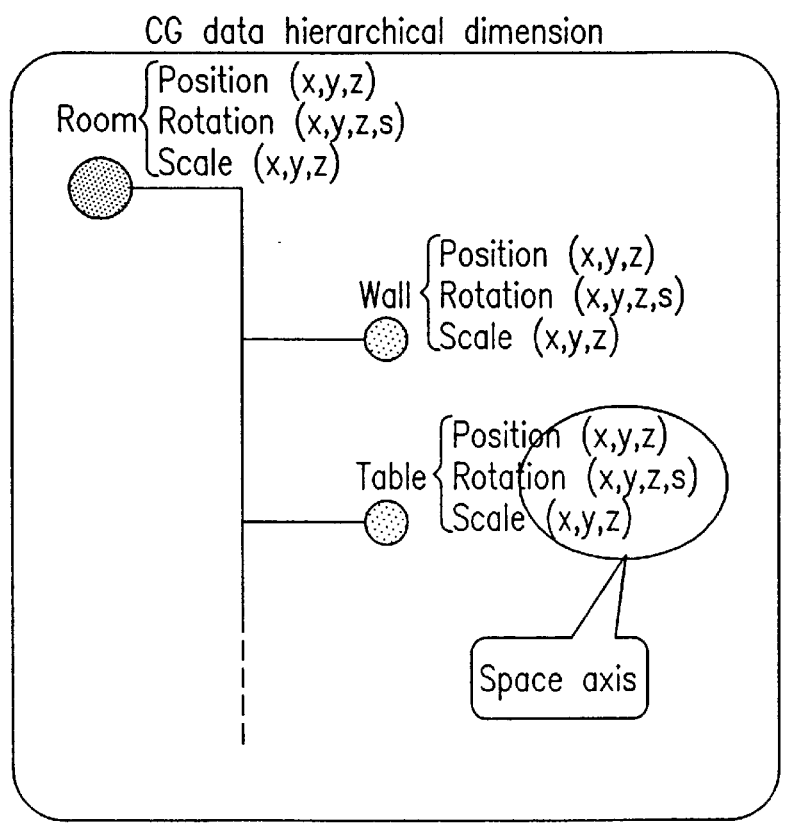
FIG. 2 shows a hierarchical structure representing a CG scene shown in FIG. 1 as an example of multi-dimensional stream data.

FIG. 2 shows a hierarchical structure representing a CG scene shown in FIG. 1 as an example of multi-dimensional stream data. As shown in FIG. 2, the wall and the table are branched from the room which is a root. If there is a cup on the table, the cup is branched from the table. The room, wall, and table respectively contain data for forming these objects. In an example shown in FIG. 2, the room, wall and table respectively contain data such as a position, a rotation, and a scale.

Figure 3:
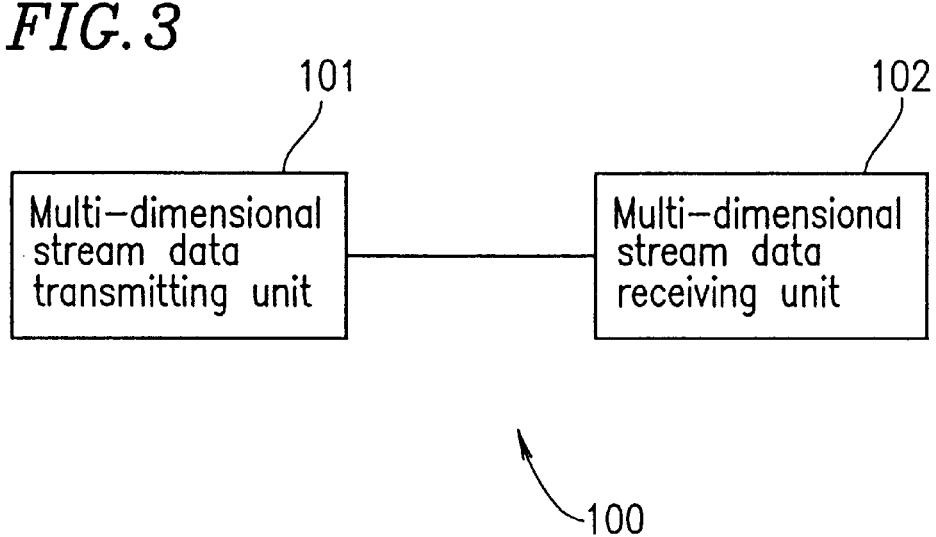
FIG. 3 shows a system which transmits and receives multi-dimensional stream data in Embodiment 1.

FIG. 3 shows a system 100 which transmits and receives multi-dimensional stream data in Embodiment 1.

The system 100 shown in FIG. 3 is provided with a multi-dimensional stream data transmitting unit 101, and a multi-dimensional stream data receiving unit 102. The multi-dimensional stream data transmitting unit 101 transmits multi-dimensional stream data in time series, and the multi-dimensional stream data receiving unit 102 receives multi-dimensional stream data in time series. The multi-dimensional stream data receiving unit 102 may reproduce a CG scene based on received multi-dimensional stream data.

Herein, the multi-dimensional stream data includes time information and space information of a plurality of dimensions, and time and space are multi-dimensional. The space information of a plurality of dimensions may include position information, rotation information, and scale information of a CG character. Alternatively, the multi-dimensional stream data may include data representing a position, a rotation and a scale of a CG character. Furthermore, the multi-dimensional stream data may be multi-dimensional animation stream data representing animation of a CG character.

A transmission path through which multi-dimensional stream data is transmitted is not limited to a telephone line or the like, and may be wireless. Furthermore, the multi-dimensional stream data receiving unit 102 may be a personal computer, a digital TV, or the like, as long as it is provided with a display device.

In Embodiment 1, CG data is transmitted as stream data. Therefore, even when a part of stream data is lost, the original CG scene can be easily reproduced. An example of a data structure of the multi-dimensional stream data will be described later.

In Embodiment 1, the multi-dimensional stream data transmitting unit may include an artificial satellite, and the multi-dimensional stream data receiving unit may be a digital TV.

In Embodiment 1, the multi-dimensional stream data transmitting unit may include an artificial satellite, and the multi-dimensional stream data receiving unit may be a set top box.

The artificial satellite receives the multi-dimensional stream data from a ground station.

In Embodiment 1, the multi-dimensional stream data transmitting unit may include a ground wave broadcasting station, and the multi-dimensional stream data receiving unit may be a digital TV.

In Embodiment 1, the multi-dimensional stream data transmitting unit may include a ground wave broadcasting station, and the multi-dimensional stream data receiving unit may be a set top box.

In Embodiment 1, the multi-dimensional stream data transmitting unit may include a wire broadcasting station, and the multi-dimensional stream data receiving unit may be a digital TV.

In Embodiment 1, the multi-dimensional stream data transmitting unit may include a wire broadcasting station, and the multi-dimensional stream data receiving unit may be a set top box.

A program for allowing a computer to execute the above-mentioned multi-dimensional stream data transmitting method and/or receiving method may be recorded in a recording medium capable of being read by a computer.

Embodiment 2

Hereinafter, Embodiment 2 will be described with reference to FIGS. 4 to 16.

In Embodiment 2, data representing a CG scene is compressed based on a tree structure of CG, and multi-dimensional stream data is transmitted at a higher speed.

Figure 4:
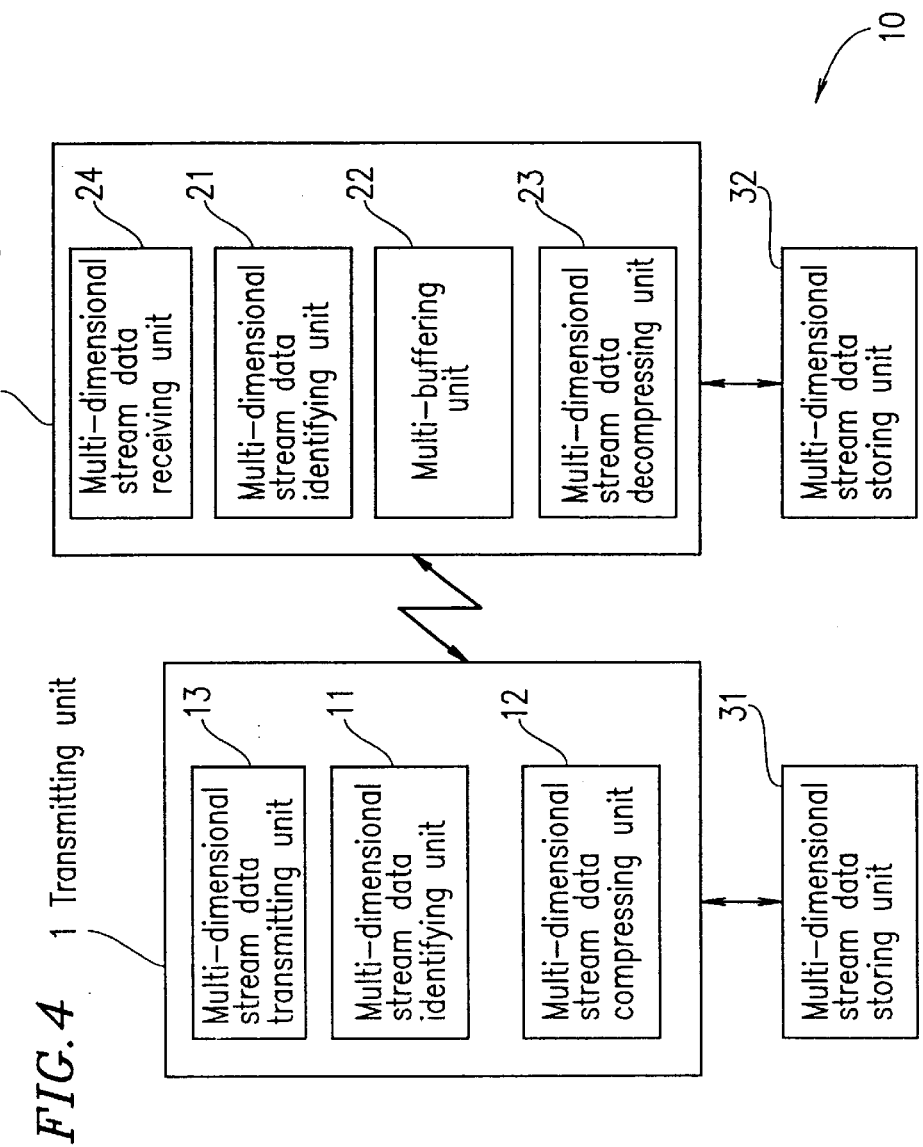
FIG. 4 shows an apparatus for transmitting and receiving multi-dimensional stream data.

FIG. 4 shows an apparatus 10 for transmitting and receiving multi-dimensional stream data. A transmitter 1 transmits multi-dimensional stream data, and a receiver 2 receives the transmitted multi-dimensional stream data.

Herein, the multi-dimensional stream data includes time information and space information of a plurality of dimensions, and time and space are multi-dimensional. The space information of a plurality of dimensions may include position information, rotation information, and scale information of a CG character. Alternatively, the multi-dimensional stream data may include data representing a position, a rotation and a scale of a CG character. Furthermore, the multi-dimensional stream data may be multi-dimensional animation stream data representing animation of a CG character.

The apparatus 10 shown in FIG. 4 includes a transmitter 1, a receiver 2, a multi-dimensional stream data storing unit 31, and a multi-dimensional stream data storing unit 32.

The transmitter 1, and the receiver 2 are realized by a computer apparatus such as a work station, a personal computer, and a game machine.

The transmitter 1 may have a stream authoring unit (not shown), or the stream authoring unit may be provided outside the transmitter 1. In accordance with the user's instruction, the steam authoring unit generates three-dimensional CG stream data representing a three-dimensional virtual space. The operation of the stream authoring unit will be described later.

Furthermore, the transmitter 1 includes a multi-dimensional stream data identifying unit 11, a multi-dimensional stream data compressing unit 12, and a multi-dimensional stream data transmitting unit 13. The receiver 2 includes a multi-dimensional stream data identifying unit 21, a multi-buffering unit 22, a multi-dimensional stream data decompressing unit 23, and a multi-dimensional stream data receiving unit 24.

First, a series of processing in the transmitter 1 will be described.

An example of identifying multi-dimensional stream data in the transmitter 1 will be described. As an example of a multi-dimensional stream, the case of transmitting motion data of a three-dimensional CG character will be described.

Figure 5:
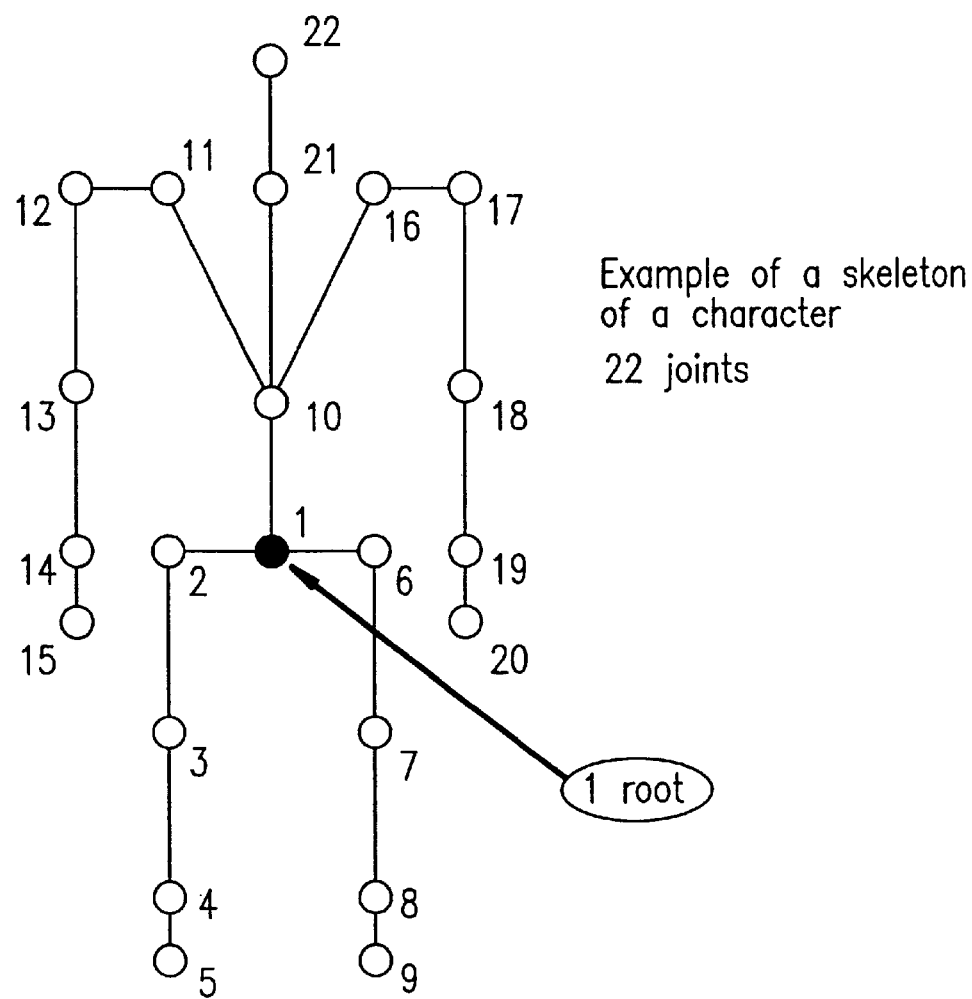
FIG. 5 shows an example of a skeleton structure of a three-dimensional CG character.

FIG. 5 shows an example of a skeleton structure of a three-dimensional CG character.

The skeleton of the three-dimensional CG character shown in FIG. 5 corresponds to a humanoid skeleton, which has 22 joints. The first joint represents a root.

The multi-dimensional stream data identifying unit 11 classifies a plurality of data input to the transmitter 1.

Figure 6:
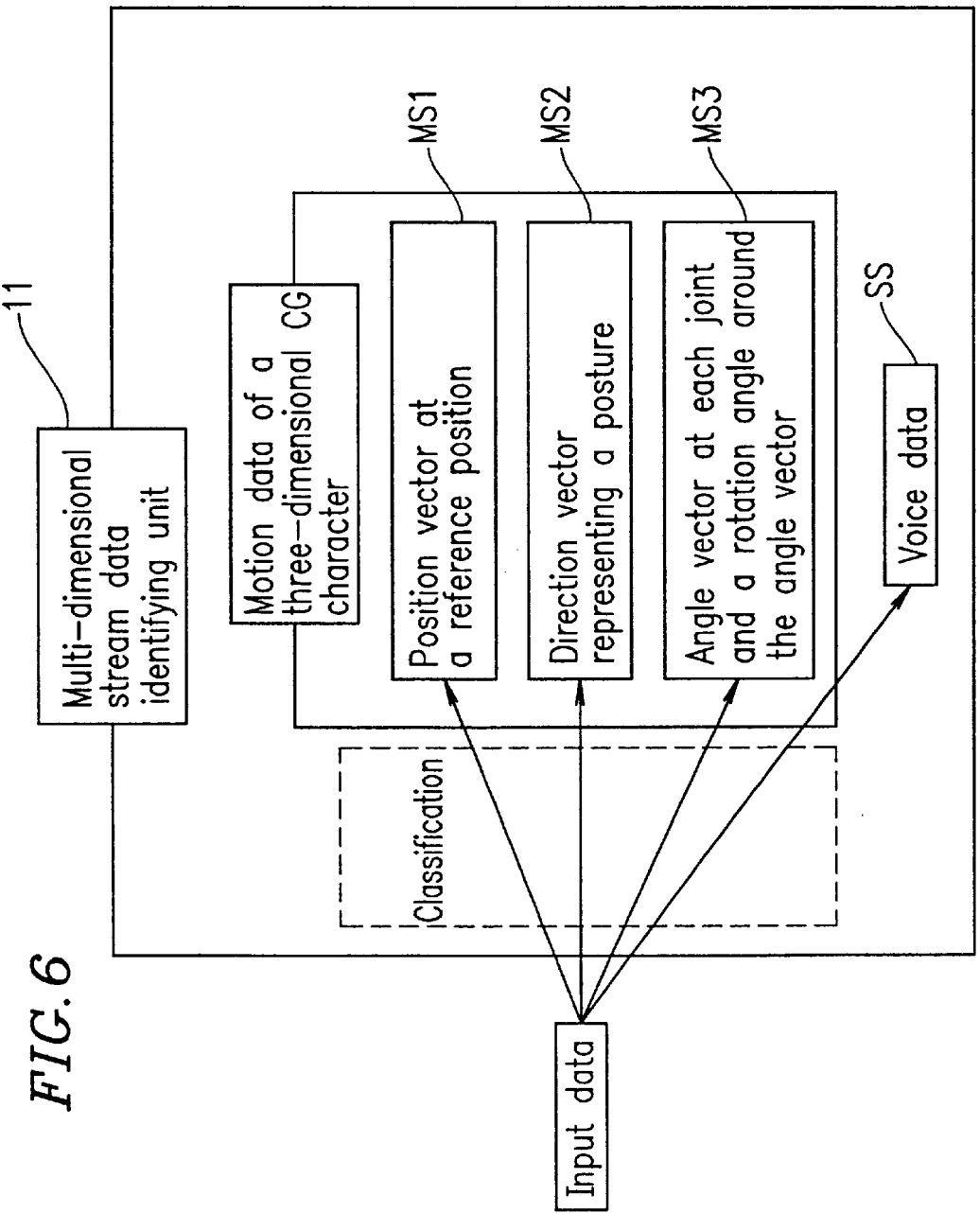
FIG. 6 shows an example of classification of input data.

FIG. 6 shows an example of classification of input data. The multi-dimensional stream data identifying unit 11 classifies the input data into a plurality of kinds of motion data of the three-dimensional CG character and voice data SS. A plurality of kinds of motion data of the three-dimensional CG character obtained by classifying the input data contain a position vector MS1 of a reference position of the three-dimensional CG character in a three-dimensional space, a direction vector MS2 representing the posture of the three-dimensional CG character at the reference position, and information MS3 of an angle vector at each joint of the skeleton and a rotation angle around the angle vector.

In the case where the three-dimensional CG character has the above-mentioned skeleton, MS1 may be a position vector of the root, MS2 may be a direction vector and a rotation angle around the direction vector, and MS3 may be a rotation axis vector at each joint and a rotation angle around the rotation axis vector. A general expression of a hierarchical structure of a three-dimensional CG character is described in detail in Japanese Patent Application No. 9-100458 filed by the Applicant. Furthermore, the multi-dimensional stream data identifying unit 11 may classify the input data into data other than motion data and voice data SS.

The multi-dimensional stream data compressing unit 12 in the transmitter 1 applies an individual compression method to the classified data MS1 to MS3 based on the tree structure of CG and/or the kind of motion data to be classified, and compresses the data MS1 to MS3 on a block basis. For example, the multi-dimensional stream data compressing unit 12 changes the compression ratio depending upon the kind of motion data.

A method for compressing multi-dimensional stream data by the multi-dimensional stream data compressing unit 12 will be described with reference to FIGS. 7 and 8.

Figure 7:
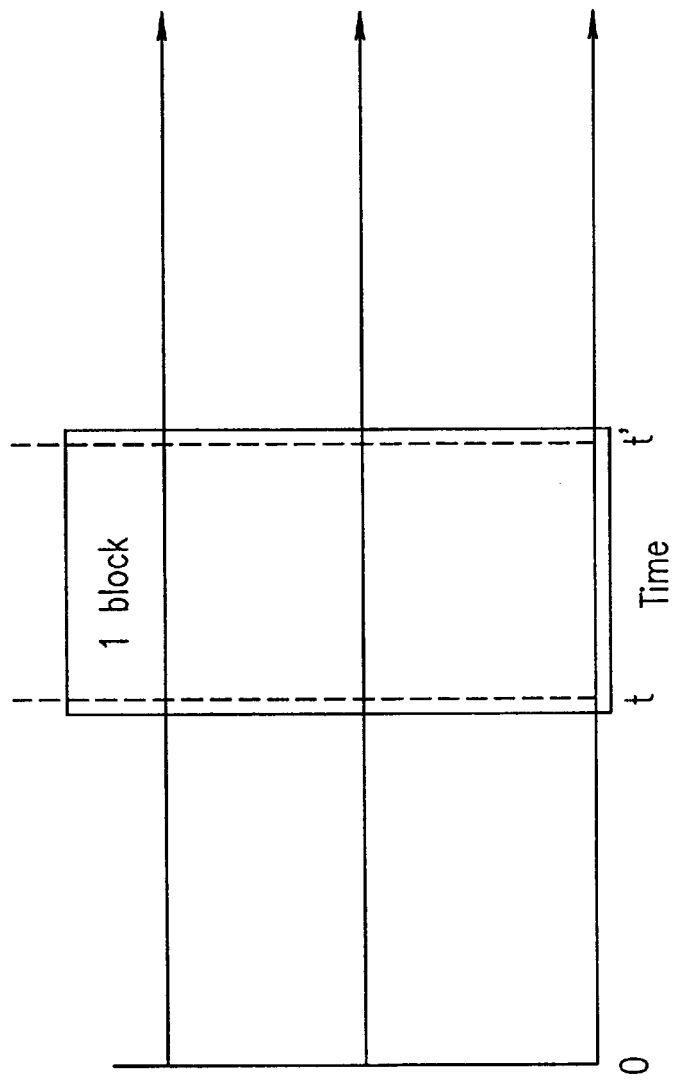
FIG. 7 shows an example of a block in a time axis direction of three-dimensional CG character motion data.
Figure 8:
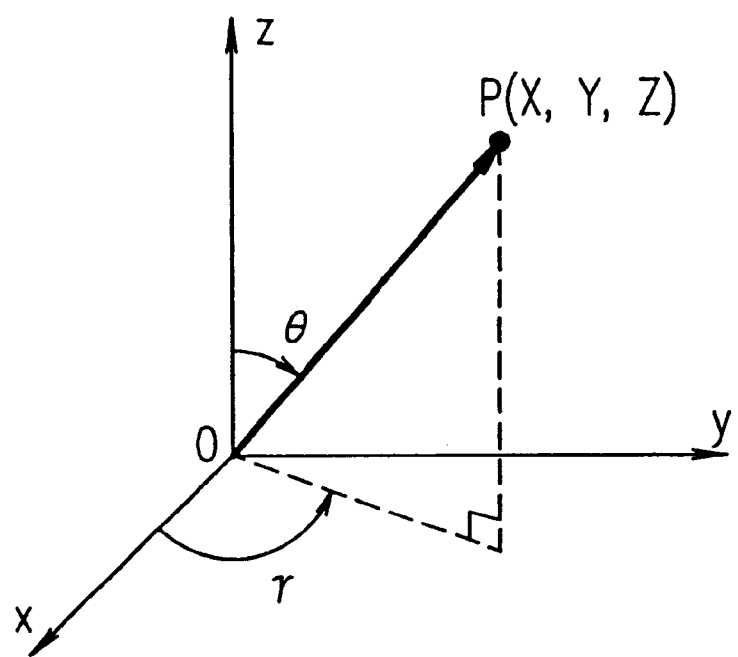
FIG. 8 shows a relationship between the three-dimensional vector coordinates and the polar coordinates.
Figure 9:
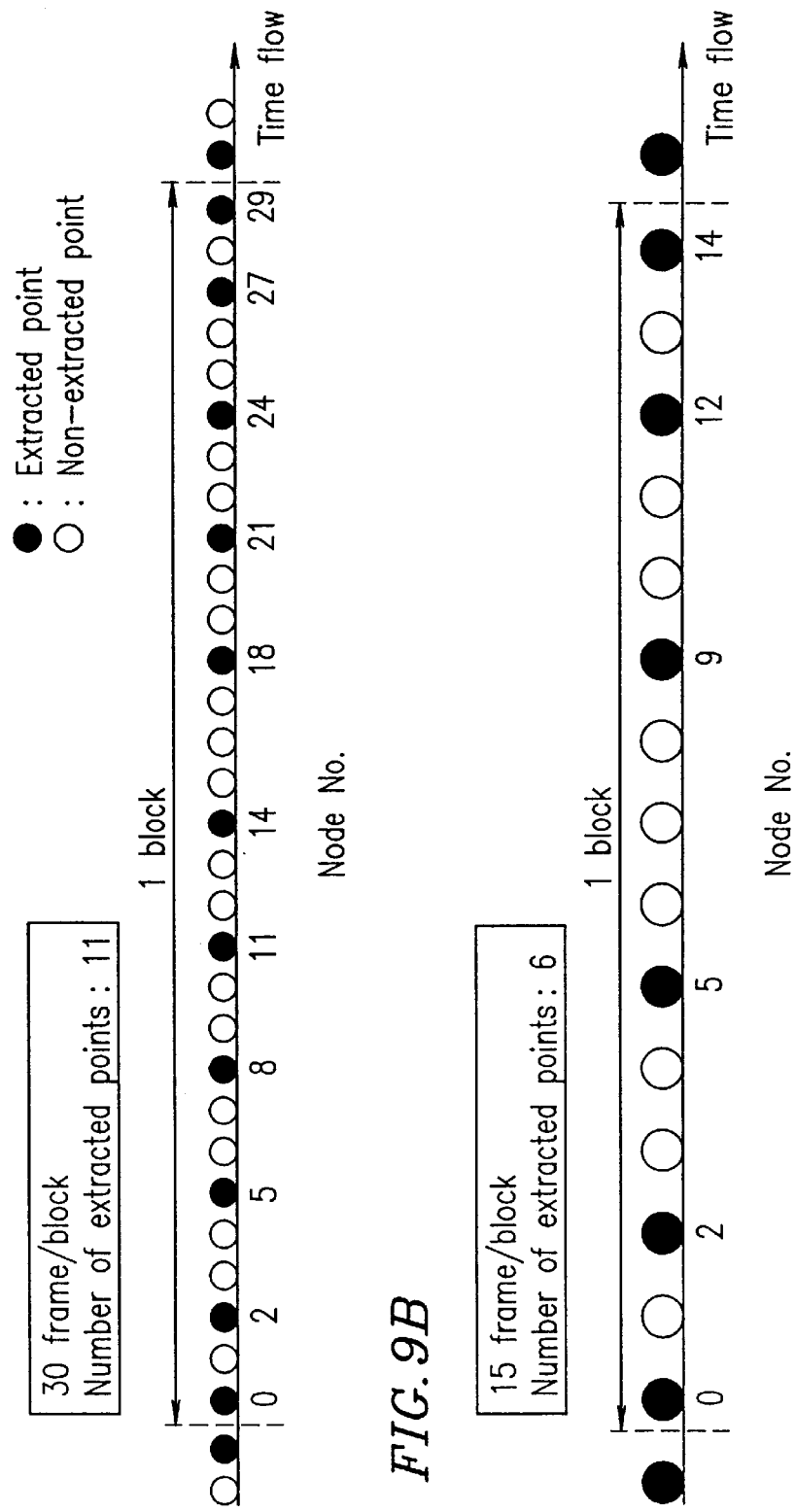
FIG. 9A shows 11 nodes extracted from 30 frame/block.
FIG. 9B shows 6 nodes extracted from 15 frame/block.

With respect to the data MS1 to MS3 of the three-dimensional CG character classified by the multi-dimensional stream data identifying unit 11, the multi-dimensional stream data compressing unit 12 puts motion data in one block during an arbitrary period (time t to time t') in a time axis direction, as shown in FIG. 7. Next, the multi-dimensional stream data compressing unit 12 applies a different compression method, depending upon the kind of the data MS1 to MS3.

A block method for compressing the data MS1 to MS3 on a block basis by the multi-dimensional stream data compressing unit 12 will be described.

The position vector MS1 at the reference position of the three-dimensional CG character has three floating points representing a position (x, y, z) in a three-axis direction. By reducing the precision of each value, data compression can be performed.

For example, in the case where each component of the position (x, y, z) is represented by 4 bytes (32 bits), the multi-dimensional stream data compressing unit 12 performs data compression by representing each component of the position by 2 bytes (16 bits).

When each component of the position is represented by 2 bytes, three floating points can be expressed in 65536 stages (−32768 to 32767) in a decimal number. By expressing the floating points of 4 bytes in 65536 stages, data of 4 bytes can be compressed to data of 2 bytes. For example, the multi-dimensional stream data compressing unit 12 may search for a maximum value and a minimum value of input floating point data during a predetermined period, divided the difference between the maximum value and the minimum value into 65536 stages, and express 4-byte data by 2 bytes.

In the above-mentioned example, data of 4 bytes is expressed by 2 bytes. However, the multi-dimensional stream data compressing unit 12 may express a component of an N-byte position by 0 to (N−1) byte.

The direction vector MS2 representing the posture of the three-dimensional CG character contains 3 components (three-dimensional vector) and the information MS3 of the angle vector at each joint and the rotation angle around the angle vector contains 4 components in total (3 components (three-dimensional vector) representing a rotation axis in a local coordinate system at each hierarchical level of the three-dimensional CG character and one component representing the rotation angle). The multi-dimensional stream data compressing unit 12 normalizes (sets the magnitude of a vector at 1) the three-dimensional vector representing the rotation axis, i.e., P (X, Y, Z) in FIG. 8, and converts rectangular coordinates into polar coordinates, thereby expressing three components (X, Y, Z) by two components (γ, θ). More specifically, the direction vector MS2 can be compressed from 3 components to 2 components in a space axis direction. The information MS3 can be compressed from 4 components to 3 components in a space axis direction.

Furthermore, the multi-dimensional stream data compressing unit 12 may compress the position vector MS1 at the reference position of the three-dimensional CG character and the angle vector at each joint and the rotation angle MS3 around the angle vector in a time axis direction. For example, the multi-dimensional stream data compressing unit 12 generates a node sequence from a plurality of kinds of motion data (e.g., at least one of the position vector MS1 and the information MS3), and extracts an arbitrary node from the node sequence, thereby compressing a plurality of kinds of motion data on a block basis.

FIG. 9A shows 11 nodes extracted from 30 frame/block. FIG. 9B shows 6 nodes extracted from 15 frame/block.

The nodes shown in FIGS. 9A and 9B represent at least one of the position vector MS1 and the information MS3. A node column represents at least one of the position vector MS1 and the information MS3 in time sequence.

As shown in FIG. 9A, in the case where the nodes in one block are denoted with Nos. 0 to 29 in 30 frame/block, 11 nodes of Nos. 0, 2, 5, 8, 11, 14, 18, 21, 24, 27, and 29 are extracted. Only the extracted nodes are output from the multi-dimensional stream data compressing unit 12, and the other nodes are not output from the multi-dimensional stream data compressing unit 12.

Furthermore, as shown in FIG. 9B, in the case where the nodes in one block are denoted with Nos. 0 to 14 in 15 frame/block, 6 nodes of Nos. 0, 2, 5, 9, 12, and 14 are extracted. Only the extracted nodes are output from the multi-dimensional stream data compressing unit 12, and the other nodes are not output from the multi-dimensional stream data compressing unit 12.

In the case where a node extracted from the multi-dimensional stream compressing unit 12 is output, the multi-dimensional stream compressing unit 12 may output interpolation information required for recovering an original node sequence from the extracted node.

The number of nodes to be extracted per block is not limited to 11 or 6. The number of nodes to be extracted is appropriately determined by a user or the like. When it is desired to enhance an image quality of a CG scene to be transmitted, the number of nodes to be extracted is increased. When a CG scene is transmitted at a high speed, the number of nodes to be extracted should be decreased.

The extracted nodes are subjected to data interpolation by three-dimensional spline interpolation in the receiver 2. Other interpolation methods such as a linear interpolation may be used in place of the three-dimensional interpolation.

The multi-dimensional stream data compressing unit 12 may reduce at least one high frequency component of a plurality of kinds of motion data, and compress the motion data on a block basis.

Next, the multi-dimensional stream data storing unit 31 will be described in detail.

Stream data MSC1 to MSC3, and SSC compressed on a block basis are stored, as multi-dimensional stream data, in a storage device in an ordinary computer apparatus in the multi-dimensional stream data storing unit 31.

Hereinafter, a format of multi-dimensional stream data stored in the multi-dimensional stream data storing unit 31 will be described in detail.

The multi-dimensional stream data compressing unit 12 puts compressed motion data in a block, and adds header information for transmitting multi-dimensional stream data to the block. The block and the header information are stored in the multi-dimensional stream data storing unit 31.

Figure 10:
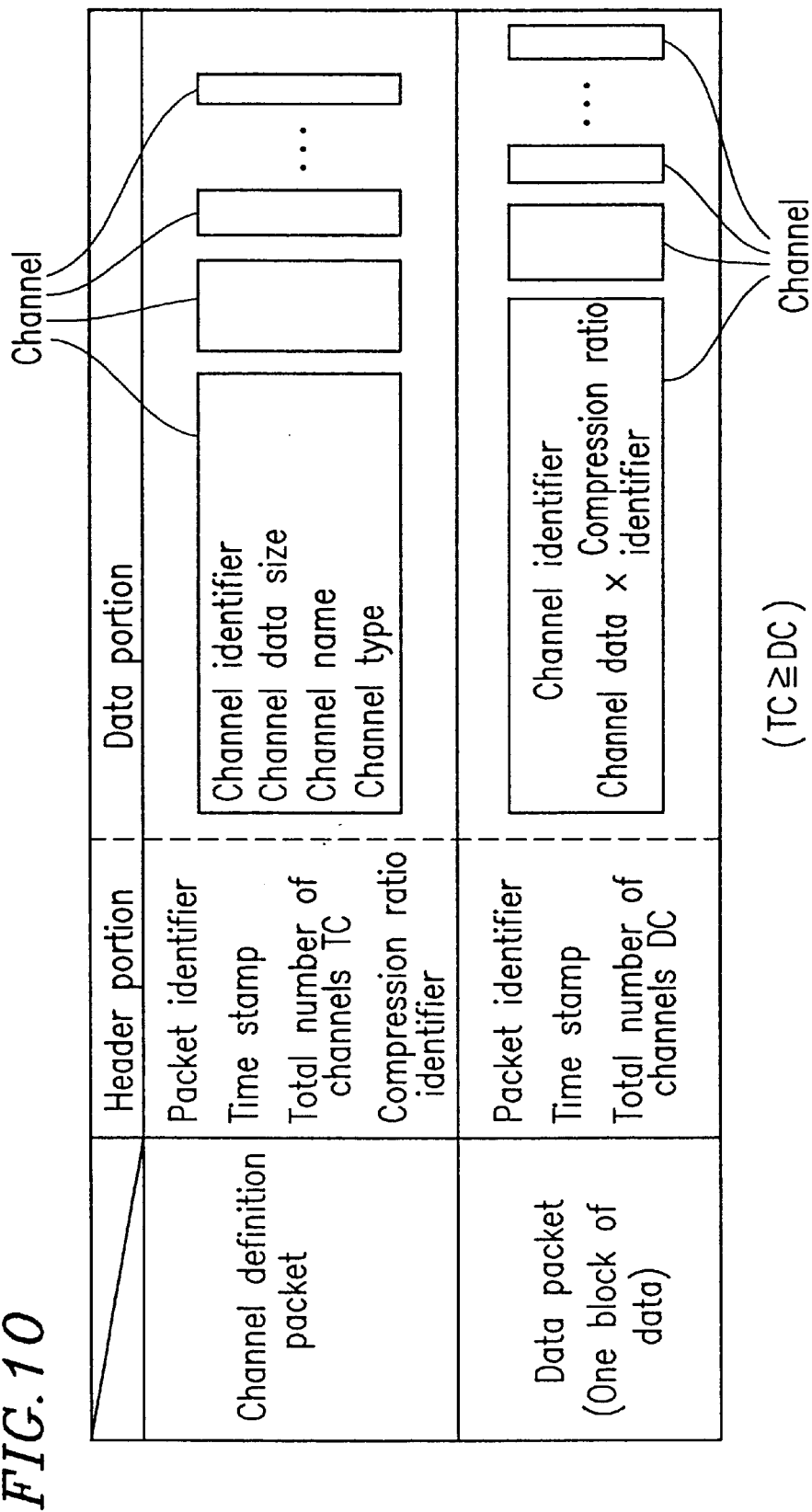
FIG. 10 shows an example of a multi-dimensional stream data format.

FIG. 10 shows an example of a format of multi-dimensional stream data stored in the multi-dimensional stream data storing unit 31.

The multi-dimensional stream data is composed of packets. Each packet has a header portion and a data portion. Depending upon the kind of stream data, one stream data will be referred to as a channel, and each channel is provided with a uniquely determined channel No. (There is no limit to the order of Nos. to be provided to the channels).

The multi-dimensional stream data stored in the multi-dimensional stream data storing unit 31 includes a channel definition packet and a data packet, as shown in FIG. 10. The channel definition packet refers to a stream defining the channels in the data packet which follows after the channel definition packet is transmitted. The channel definition packet and the data packet respectively have a header portion and a data portion.

The header portion of the channel definition packet includes, for example, a packet identifier which identifies itself as the channel definition packet, a time stamp which represents a time based on a certain reference time when the channel definition packet is generated, the total number TC of channels through which data can be transmitted in the channel definition packet, and a compression ratio identifier which represents the number of nodes when the nodes are extracted under compression on a block basis of the stream data. The data portion of the channel definition packet includes the total number TC of channels. Each channel of the channel definition includes a channel identifier which represents a channel No., a data size of the channel, a channel name, and a channel type which represents if the channel is a position vector or a rotation angle vector.

As described above, the data packet includes a header portion and a data portion.

The header portion of the data packet includes, for example, a packet identifier which identifies itself as a data packet, a time stamp which represents a time based on a certain reference time when the channel definition packet is generated, and the total number DC of channels (TC≧DC) through which data can be transmitted in the data packet.

The data portion of the data packet includes the total number DC of channels, and each channel includes a channel identifier which represents a channel No., channel data and compression ratio identifier (e.g., the number of extracted notes, etc.). It is noted that the number of compression identifiers is equal to that of the channel data. The data packet is equal to one block of multi-dimensional steam data.

Figure 11:
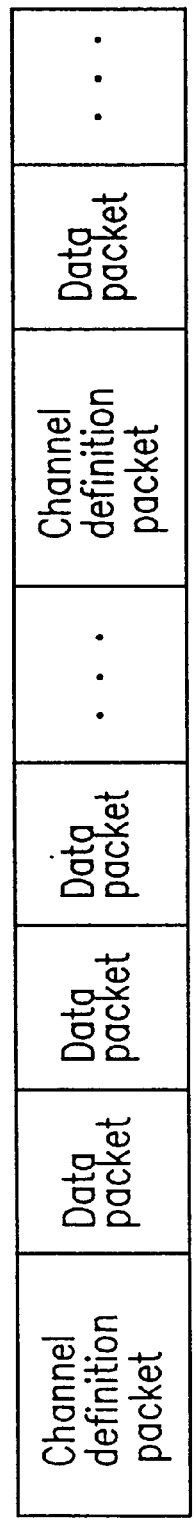
FIG. 11 shows an exemplary structure of multi-dimensional stream data in a time axis direction.

FIG. 11 shows an exemplary structure of the channel definition packet and the data packet. When the channel definition packet is first transmitted, only the data packets may be transmitted thereafter. In the case where it is desired to change the channel definition in the middle of a stream, the channel definition can be easily changed by transmitting the channel definition packet in the middle.

The multi-dimensional stream data is not limited to the packet shown in FIG. 10. For example, the multi-dimensional stream data may have header information or stream format describing data, describing the kind of multi-dimensional stream data, the order of a plurality of motion data, and the length of a plurality of motion data.

Next, the multi-dimensional stream data storing unit 31 stores a plurality of stream data having different compression ratios. In the case where an excessive or insufficient amount of data flows through a transmission path between the transmitter 1 and the receiver 2, in order to effectively utilize the transmission path, the transmitter 1 selects stream data with an optimum compression ratio, in accordance with at least one of the state of the transmission path, the request from the receiver 2, and the request from a user. This will be described below. To store a plurality of stream data having different compression ratios will be referred to as a multi-hierarchical storage method.

The transmitter 1 generates stream data which is compressed at a certain compression ratio on a block basis, and generates some kinds of stream data which are compressed at a different compression ratio from that of the compressed stream data. The stream data compressed at a different compression ratio are stored in the multi-dimensional stream data storing unit 31.

Figure 12:
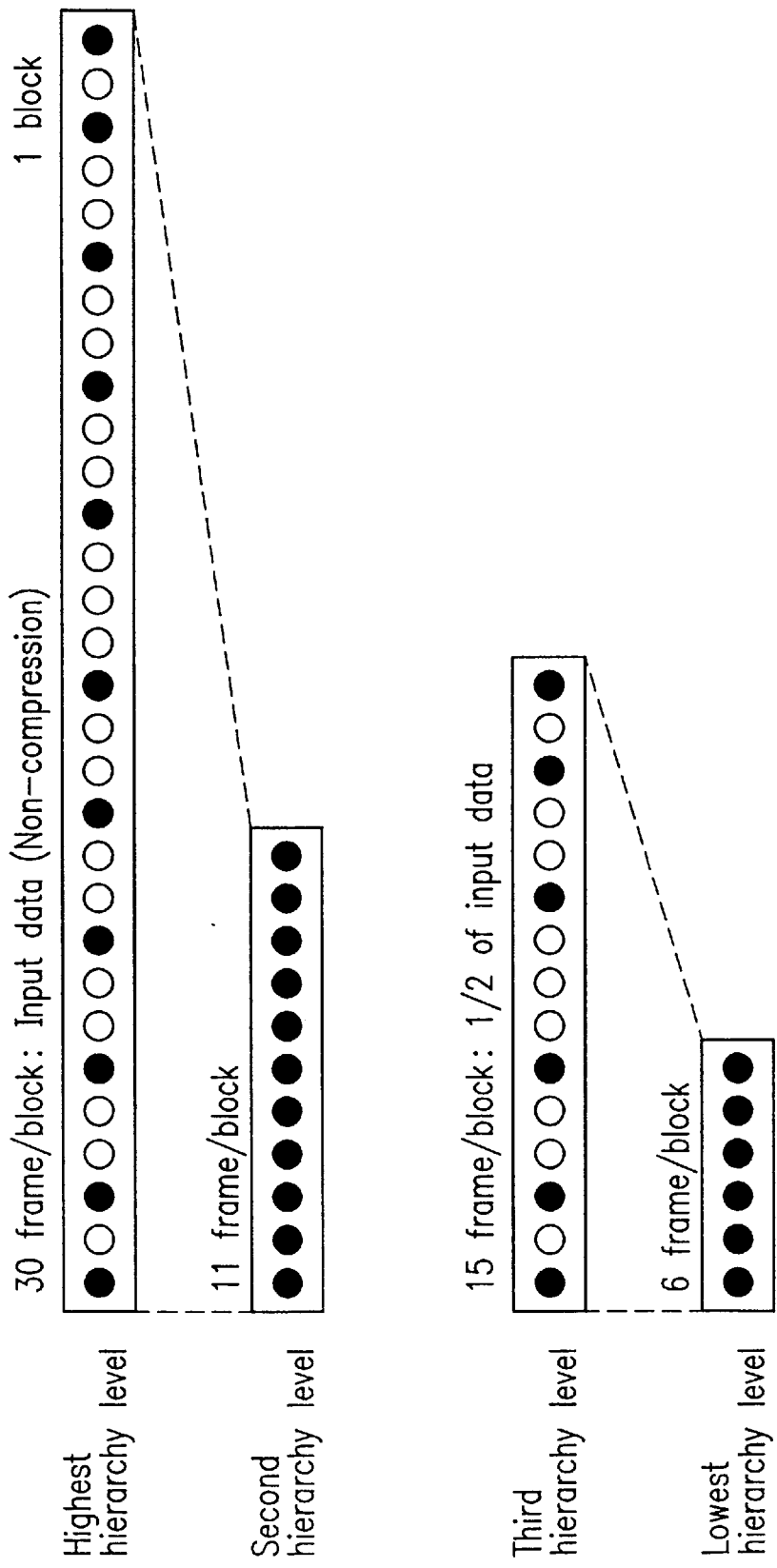
FIG. 12 shows an example of stream data output from a transmitter in the case where data input to the transmitter is 30 frame/block.

FIG. 12 shows an example of stream data output from the transmitter 1 in the case where data input to the transmitter 1 is 30 frame/block.

The highest hierarchical level shown in FIG. 12 refers to stream data obtained by outputting input data in 30 frame/block as one block without compressing it. The second hierarchical level refers to stream data obtained by compressing input data in 30 frame/block into data in 11 frame/block. The third hierarchical level refers to stream data obtained by thinning out every other input data in 30 frame/block, thereby compressing the input data into data in 15 frame/block which is a half data amount. The lowest hierarchical level refers to stream data obtained by compressing stream data in 15 frame/block into data in 6 frame/block. Furthermore, the stream data at the second hierarchical level and the stream data at the lowest hierarchical level are complemented by three-dimensional spline interpolation.

Multi-hierarchical stream data is stored in the multi-dimensional stream data storing unit 31, whereby stream data containing an information amount in accordance with the state of the transmission path can be transmitted.

Furthermore, according to the multi-hierarchical storage method, a compression ratio of stream data transmitted from the transmitter can be controlled to be optimum so as to be consistent with the ability of a control circuit (e.g., computer) included in the receiver 2.

Next, the data transmission between the transmitter 1 and the receiver 2 will be described.

In the case where there is an instruction from a control portion of the transmitter 1 or there is a request from the receiver 2, the transmitter 1 transmits multi-dimensional stream data stored in a storage device in a computer apparatus, i.e., the multi-dimensional stream data storing unit 31. A medium for data transmission in this case is assumed to be a bi-directional communication system, i.e., the Internet. However, data can be similarly transmitted and received via a broadcasting system such as satellite broadcasting and ground wave broadcasting.

Hereinafter, a series of processing of the receiver 2 will be described.

The multi-dimensional stream data receiving unit 24 receives multi-dimensional stream data transmitted from the transmitter 1.

Next, identification of multi-dimensional stream data in the receiver 2 will be exemplified. The case where multi-dimensional stream data of a three-dimensional CG character is received will be described as an example of a multi-dimensional stream. The multi-dimensional stream data includes the above-mentioned compressed motion data in a predetermined stream format. The motion data included in the multi-dimensional stream data may not be compressed.

First, the multi-dimensional stream data receiving unit 24 in the receiver 2 receives multi-dimensional stream data MSC1 to MSC3 transmitted from the transmitter 1. In the case where the transmitted multi-dimensional stream data MSC1 to MSC3 has a format as shown in FIG. 10, the multi-dimensional stream data identifying unit 21 first receives a packet identifier and analyzes it, thereby determining if the received stream data is a channel definition packet or a data packet.

In the case where the multi-dimensional stream data identifying unit 21 determines the transmitted multi-dimensional stream data MSC1 to MSC3 to be a channel definition packet, the multi-dimensional stream data identifying unit 21 then receives a time stamp, the total number of channels TC, and a compression ratio identifier, and analyzes them. Subsequently, the multi-dimensional stream data identifying unit 21 receives a data portion, i.e., channel identifiers, channel data sizes, channel names, and channel types respectively by the total number of channels TC, and analyze them. If the multi-dimensional stream data identifying unit 21 fails in data analysis, the receiver 2 requests the transmitter 1 to re-transmit data so as to obtain data again. Alternatively, the receiver 2 forcefully terminates a connection of the transmitter 1 and the receiver 2. Herein, the compression ratio identifier means compression information such as a compression method and a compression ratio used in the compression method.

In the case where the multi-dimensional stream data identifying unit 21 determines that the transmitted multi-dimensional stream data MSC1 to MSC3 to be a data packet, the multi-dimensional stream data identifying unit 21 receives a time stamp, and the total number of channels DC, and analyzes them. Then, the multi-dimensional stream data identifying unit 21 receives a data portion, i.e., a channel identifier, channel data, and a compression ratio identifier, and analyzes them. This is repeated by the total number of channels DC. The multi-dimensional stream data identifying unit 21 assumes that only the position vector at the reference position and the direction vector representing a posture among motion data of a three-dimensional CG character have special channel names, and distinguishes these vectors from each other based on the channel names.

In the case where the multi-dimensional stream data identifying unit 21 fails in data analysis of the data packet, the receiver 2 requests the transmitter 1 to re-transmit data so as to obtain the data again. Alternatively, the receiver 2 forcefully terminates a connection of the transmitter 1 and the receiver 2. Alternatively, the receiver 2 discards the data packet whose analysis has failed, and receives a subsequent packet, whereby the connection can be continued.

Next, the multi-buffering unit 22 in the receiver 2 will be described.

In the multi-buffering unit 22 in the receiver 2, multi-dimensional stream data divided into blocks is buffered on a block basis at a multiplicity which is consistent with processing performance or an execution speed of a computer having the receiver 2. More specifically, in the case where the processing performance and execution speed of the computer are large, multiplicity of buffering is set to be large. In the case where the processing performance and execution speed of the computer are small, multiplicity of buffering is set to be small. In this case, data storage for buffering is performed by the multi-dimensional stream data storing unit 32. The multi-buffering will be described in more detail together with the later description of simultaneous reproduction.

Next, the multi-dimensional stream data decompressing unit 23 in the receiver 2 will be described.

In the multi-dimensional stream data decompressing unit 23 in the receiver 2, compressed stream data MSC1 to MSC3 for one block of the data packet are decompressed by a different method depending upon compression information represented by the compression identifier. For example, the multi-dimensional stream data decompressing unit 23 may determine a decompression method based on compression information. The multi-dimensional stream data decompressing unit 23 may determine a decompression ratio for decompressing compressed motion data based on compression information.

In the case where compression in a time axis direction in one block and compression for decreasing precision of a value of each component (e.g., 4 bytes of data is compressed to 2 bytes of data) are performed in the position vector data MSC1 at a reference position of a three-dimensional CG character, the multi-dimensional stream data decompressing unit 23 first performs decompression (2 bytes of data is decompressed to 4 bytes of data by reverse conversion of compression conversion) with respect to the compression for decreasing precision of a value of each component. Then, with respect to the compression in a time axis direction, the multi-dimensional stream data decompressing unit 23 performs decompression of one block of stream data by three-dimensional spline interpolation, linear interpolation, or the like, using a compression identifier in the header portion of the channel definition packet.

The multi-dimensional stream data decompressing unit 23 converts the direction vector data MSC2 from the polar coordinates to the three-dimensional vector coordinates. For example, in the case where the direction vector data MSC2 representing the posture of a three-dimensional CG character has two polar coordinates components representing a rotation axis and is received as stream data, the multi-dimensional stream data decompressing unit 23 may convert the position vector data MSC2 from the polar coordinates to the three-dimensional vector coordinates to obtain a direction vector representing a rotation axis with a magnitude 1.

In the angle vector at each joint of a three-dimensional CG character and rotation angle around the angle vector MSC3, in the same way as in the conversion from the polar coordinates in the direction vector representing the posture to the three-dimensional vector coordinates, the multi-dimensional stream data decompressing unit 23 first obtains three three-dimensional vector coordinates from two polar coordinates. Then, in the same way as in the decompression of stream data in a time axis direction in the position vector MSC1 at the reference position, the multi-dimensional stream data decompressing unit 23 performs decompression of one block of stream data by three-dimensional spline interpolation, linear interpolation, or the like, using a compression ratio identifier in a header portion of the channel definition packet.

After the decompression of multi-dimensional stream data is completed in the multi-dimensional stream data decompressing unit 23, the multi-dimensional stream data storing unit 32 stores the decompressed multi-dimensional stream data. In the case where a three-dimensional CG reproduction unit provided outside requests stream data, stream data is supplied from the multi-dimensional stream data storing unit 32, whereby the receiver 2 can reproduce three-dimensional CG scene in real time.

Multi-buffering and synchronous reproduction of multi-dimensional stream data and a method for reproducing data in real time in the receiver 2 will be described in detail.

Hereinafter, the case where one motion stream data and one voice stream data of a three-dimensional CG character are buffered when the receiver 2 is provided with a reproduction unit (not shown) will be described.

Figure 13:
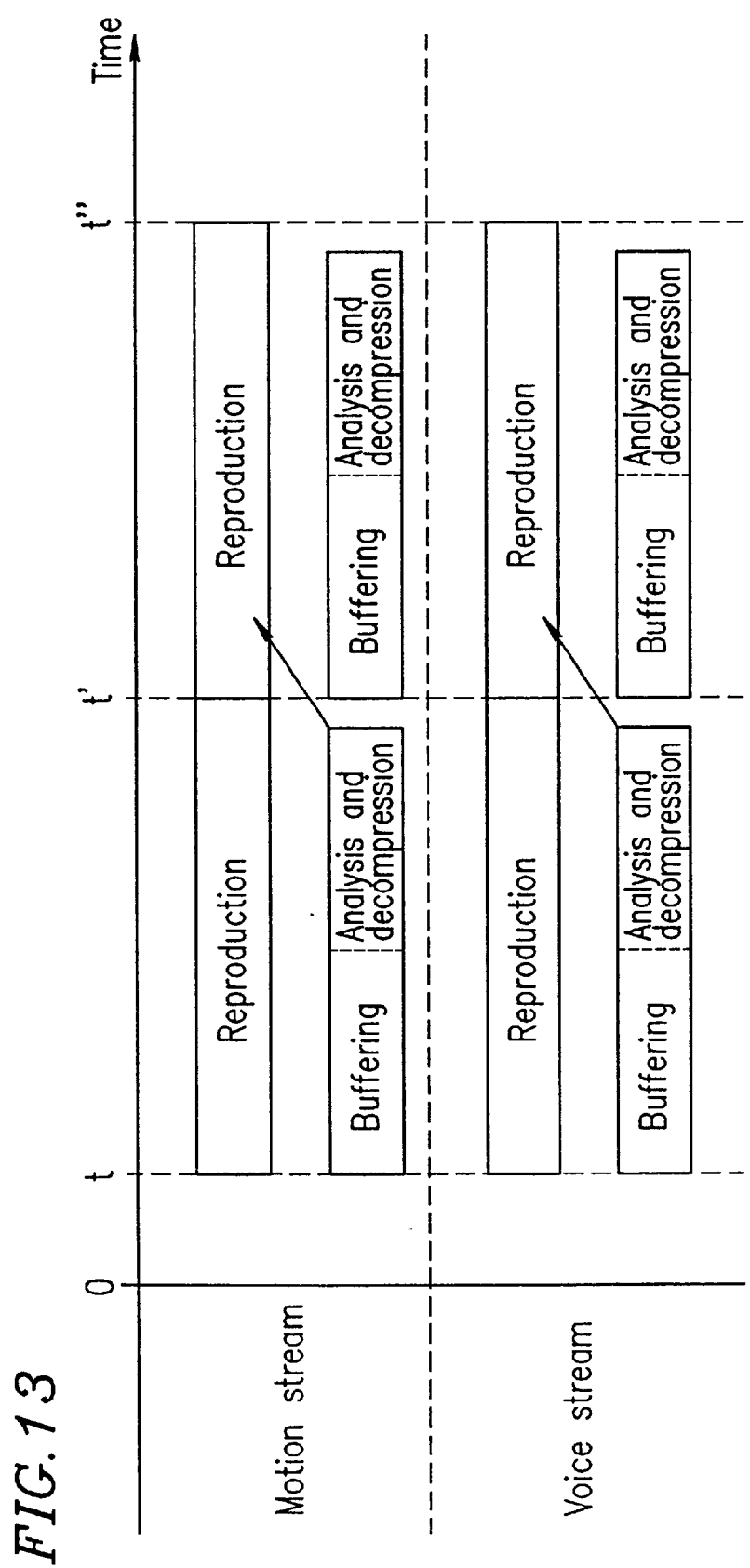
FIG. 13 shows reproduction of a motion stream and a voice stream in the case where a receiver is provided with a reproduction unit.

FIG. 13 shows reproduction of a motion stream and a voice stream in the case where the receiver 2 is provided with a reproduction unit. A reproduction process and a buffering process are performed with respect to the motion stream and the voice stream.

According to the reproduction process for reproducing a motion stream during one block of period (time t to time t'), a reproduction unit reproduces the motion of a three-dimensional CG character from buffered motion stream data, in accordance with time stamps of the motion stream data. According to the buffering process of a motion stream, the receiver 2 receives motion stream data, for example, in a block following the block to which the motion stream data which is currently being reproduced belongs, i.e., in a block corresponding to a period (time t' to time t"). The multi-dimensional buffering unit 22 buffers the received motion stream data. The multi-dimensional stream data identifying unit 21 analyzes motion stream data, and the multi-dimensional stream data decompressing unit 23 decompresses motion stream data. In order to prepare for the reproduction of the motion stream data (data reproduction in the subsequent block), the multi-dimensional buffering unit 22 buffers the decompressed motion stream data again.

Voice stream data is also subjected to the above-mentioned reproduction process and buffering process. Furthermore, even in the case where multiplicity of buffering is increased, multi-buffering can be realized by a similar operation.

In the case where the transmission speed of stream data from the receiver 2 to the reproduction unit which reproduces three-dimensional CG data is higher than the buffering speed, i.e., in the case where stream data cannot be received and decompressed before being transmitted to the reproduction unit, the receiver 2 requests the transmitter 1 of compressed multi-dimensional stream data having a low data amount and an optimum compression ratio for data reproduction, and the receiver 2 receives data, whereby real time data reproduction can be maintained.

Figure 14:
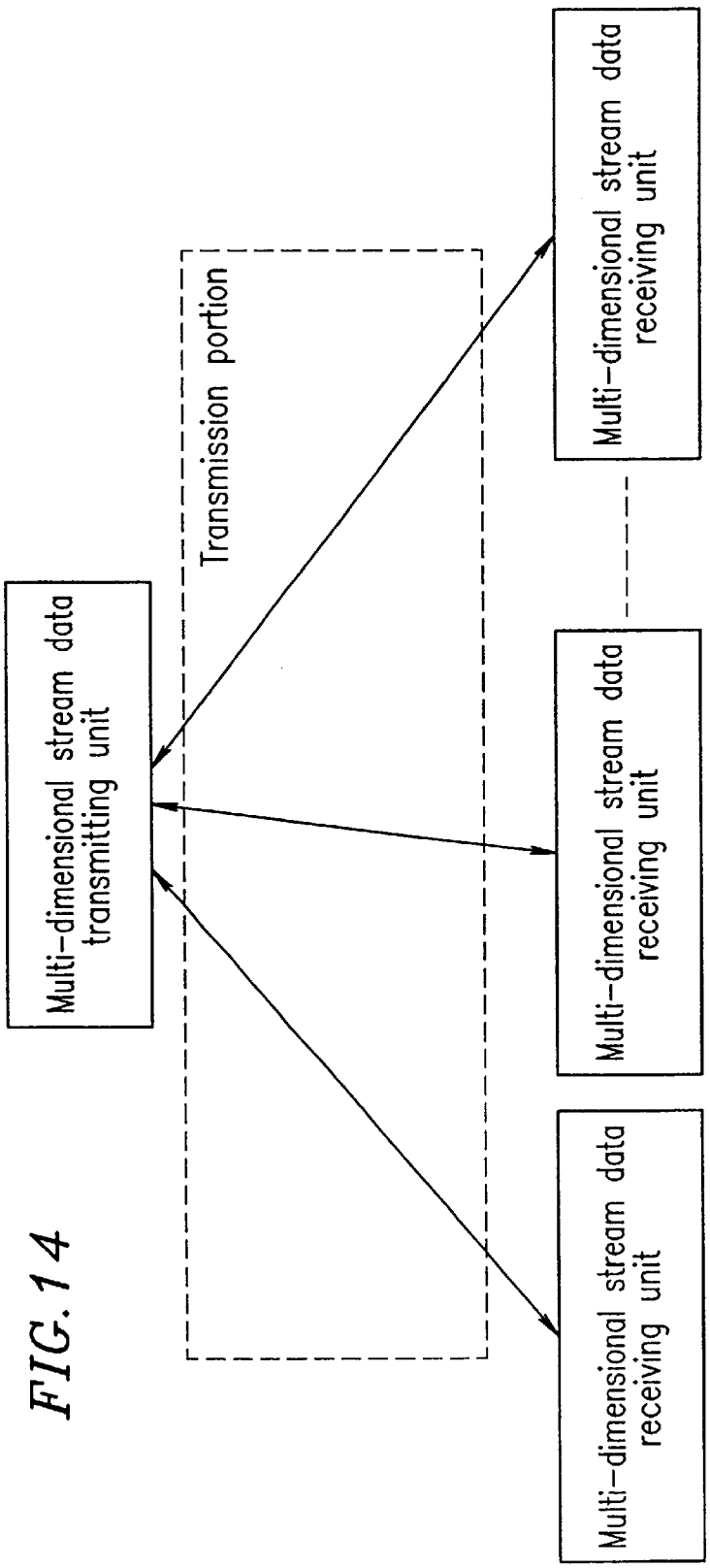
FIG. 14 illustrates that a plurality of receivers are connected to the transmitter.

A minimum structure of an apparatus for transmitting and receiving multi-dimensional stream data (i.e., the case where one receiver 2 is connected to one transmitter 1) has been described. However, as shown in FIG. 14, a plurality of receivers 2 may be connected to one transmitter 1 via a transmission portion.

Figure 15:
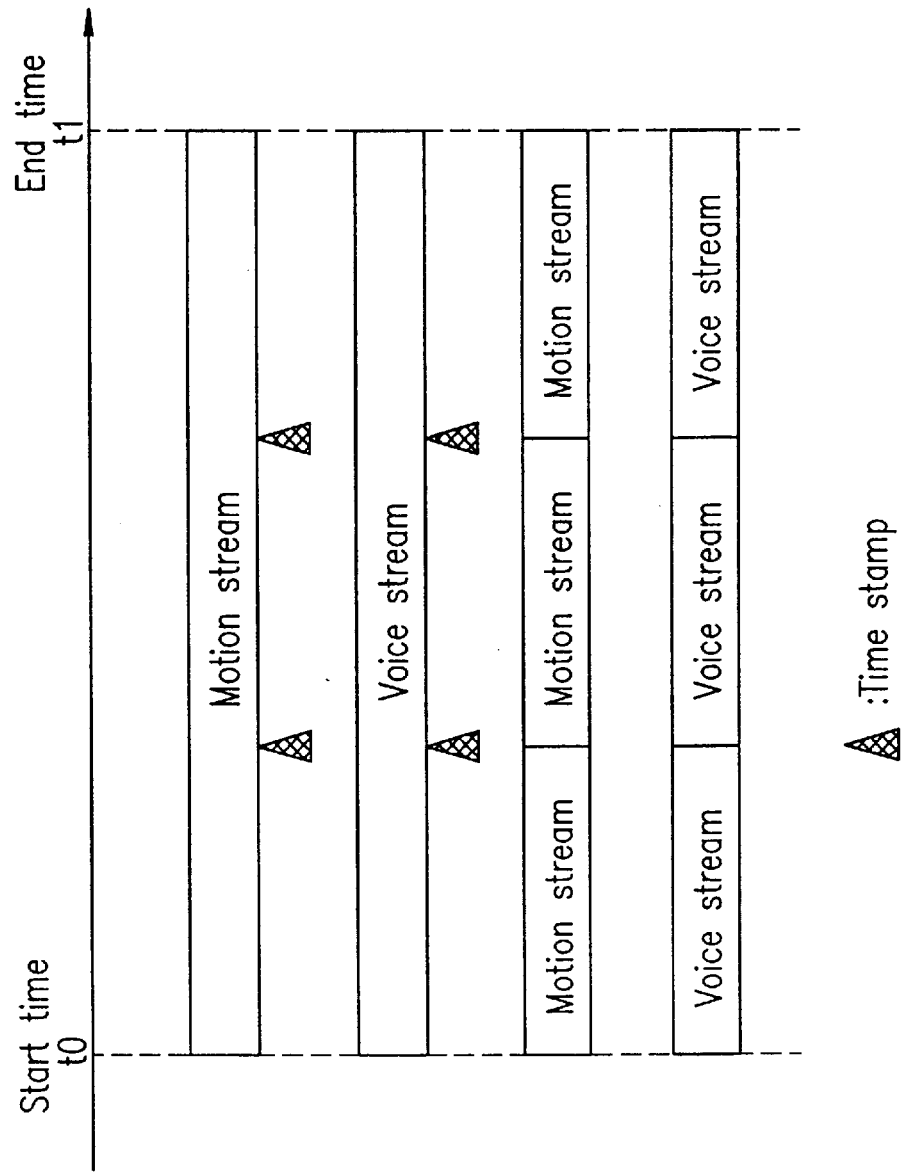
FIG. 15 shows an example in which time stamps are inserted in a stream authoring unit.

As described above, the transmitter 1 may be provided with a stream authoring unit (not shown). Hereinafter, the basic operation of the stream authoring unit mentioned with reference to FIG. 4 will be briefly described. The stream authoring unit cuts motion stream data and voice stream data of a three-dimensional CG character having an arbitrary data length into an arbitrary length required for synchronization. The data length of the motion stream data is determined based on the duration of an operation, and the data length of the voice stream data is determined based on the reproduction time of a voice. As shown in FIG. 15, the stream authoring unit gives time stamp information required for synchronization to the motion stream and the voice stream. Furthermore, the stream authoring unit connects the motion stream to the voice stream, if required, and generates a new stream. The stream authoring unit registers the stream data thus edited in the transmitter 1 as input data.

In the case where the receiver 2 shown in FIG. 4 has a reproduction unit, the motion stream is preferably reproduced in synchronization with the reproduction of the voice stream, based on time stamp information of the motion stream and time stamp information of the voice stream. Furthermore, the voice stream may be reproduced in synchronization with the reproduction of the motion stream, based on each time stamp.

Hereinafter, the basic operation of the apparatus for transmitting and receiving multi-dimensional stream data in the present embodiment will be described with reference to FIGS. 16 and 17.

Figure 16:
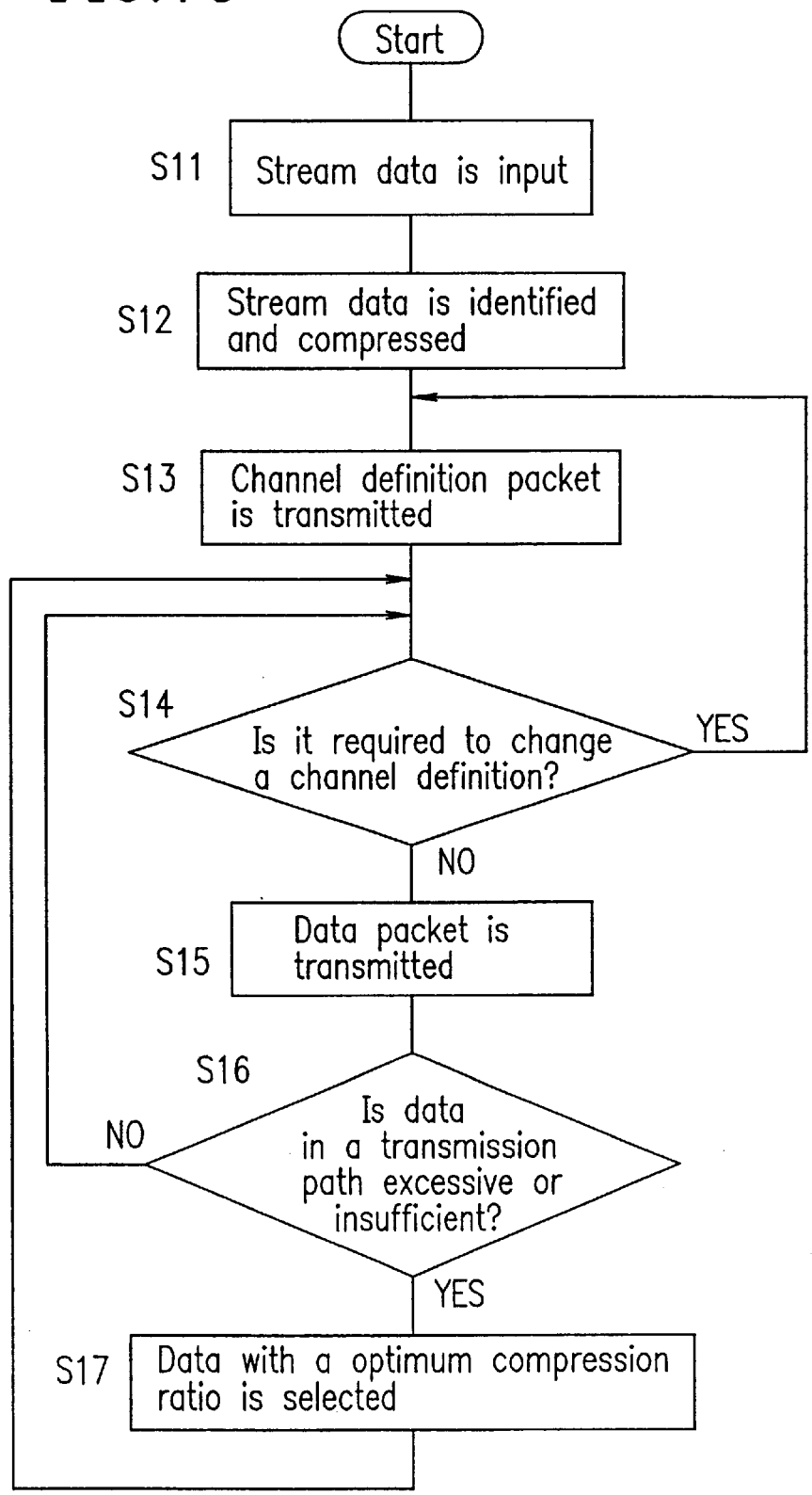
FIG. 16 is a flow chart illustrating the operation of the transmitter.
Figure 17:
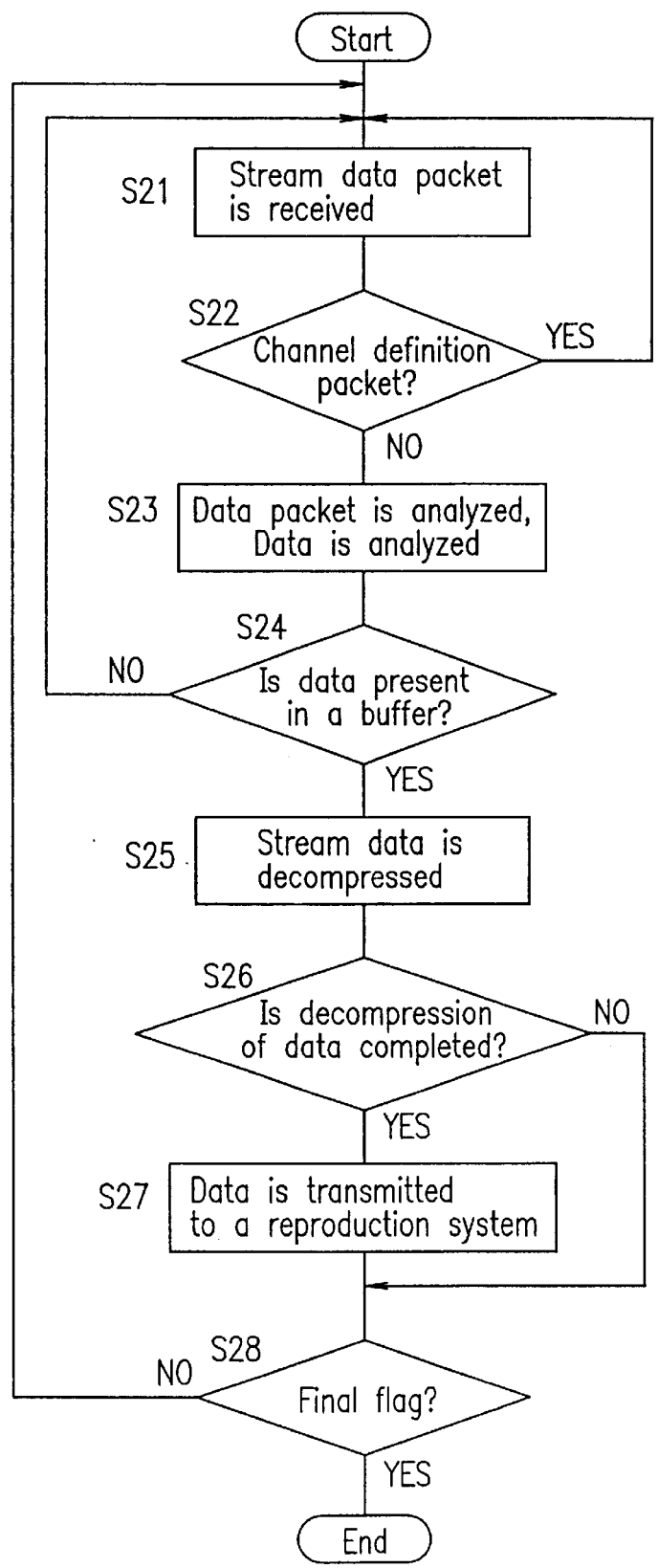
FIG. 17 is a flow chart illustrating the operation of the receiver.

FIG. 16 is a flow chart illustrating the operation of the transmitter 1, and FIG. 17 is a flow chart illustrating the operation of the receiver 2.

First, an exemplary basic operation of the transmitter 1 will be described.

At Step S11 in FIG. 16, stream data MS1 to MS3 and SS created in the external stream data authoring unit are input to the transmitter 1.

At Step S12, the transmitter 1 identifies the stream data MS1 to MS3 and SS input at Step S11, and compresses the stream data to obtain compressed stream data MSC1 to MSC3 and SSC. The transmitter 1 generates and stores multi-dimensional stream data packets.

At Step S13, the transmitter 1 transmits a channel definition packet to the receiver 2.

At Step S14, the transmitter 1 determines whether or not the receiver 2 requests that the channel definition should be changed. In the case where the channel definition should be changed, the process returns to Step S13.

At Step S15, the transmitter 1 transmits a data packet to the receiver 2.

At Step S16, the transmitter 1 determines whether or not the amount of data which flows through a transmission path is excessive or insufficient. In the case where the amount data to be transmitted exceeds an allowable amount in the transmission path, or in the case where the amount of data to be transmitted is below the allowable amount, or in the case where the receiver 2 requests that data to be transmitted should be changed, the process proceeds to Step S17. In the case where the transmitter 1 determines that the amount of data is not excessive or insufficient, the process proceeds to Step S14.

At Step S17, the transmitter 1 selects stream data with an optimum compression ratio consistent with the state of the transmission path, or stream data with an optimum compression ratio in accordance with a request from the receiver 2. Then, the process returns to Step S14.

Next, an example of the operation of the receiver 2 will be described.

At Step S21 in FIG. 17, the receiver 2 receives the multi-dimensional stream data packet from the transmitter 1.

At Step S22, the receiver 2 determines whether or not the stream data packet received at Step 21 is a channel definition packet. In the case where the received packet is a channel definition packet, the process returns to Step S21.

At Step S23, the receiver 2 analyzes the data packet and data.

At Step S24, the receiver 2 determines whether or not data is present in a buffer. In the case where data is not present, the process returns to Step S21.

At Step S25, the receiver 2 decompresses one block of stream data present in the buffer by the number of kinds of required stream data.

At Step S26, the receiver 2 determines whether or not one block of data has been decompressed at Step S25. In the case where one block of data has been decompressed, the receiver 2 transmits the decompressed data to a reproduction unit. That is, the process proceeds to Step 27. In the case where one block of data has not been decompressed, the process proceeds to Step S28.

At Step S27, the receiver 2 transmits the decompressed stream data to a reproduction unit. At Step S27, the receiver 2 determines whether or not a final flag has been generated by a user. In the case where no final flag has been generated, the process returns to Step S21. In the case where a final flag has been generated, the receiver 2 terminates its operation.

In Embodiment 2, the transmitter may include an artificial satellite, and the receiver may be a digital TV.

In Embodiment 2, the transmitter may include an artificial satellite, and the receiver may be a set top box.

The artificial satellite receives the multi-dimensional stream data from a ground station.

In Embodiment 2, the transmitter may include a ground wave broadcasting station, and the receiver may be a digital TV.

In Embodiment 2, the transmitter may include a ground wave broadcasting station, and the receiver may be a set top box.

In Embodiment 2, the transmitter may include a wire broadcasting station, and the receiver may be a digital TV.

In Embodiment 2, the transmitter may include a wire broadcasting station, and the receiver may be a set top box.

A program for allowing a computer to execute the above-mentioned multi-dimensional stream data transmitting method and/or receiving method may be recorded in a recording medium capable of being read by a computer.

According to the present invention, motion data, voice data, and the like of a three-dimensional CG character are separately compressed depending upon the kind, and the compressed data is transferred as a stream in real time, while information required for reproducing each data in synchronization is simultaneously transferred. Thus, a smooth motion of the three-dimensional CG character and sound information in synchronization with the motion can be interactively transmitted and received in accordance with a user's request in a transmitting/receiving system based on a network, and the amount of data to be transferred can be substantially reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A transmitter comprising a multi-dimensional stream data transmitting unit, for transmitting multi-dimensional stream data, a multi-dimensional stream data identifying unit for classifying input data into a plurality of kinds of motion data;

a multi-dimensional stream data compressing unit for compressing the plurality of kinds of motion data on a block basis; and a multi-dimensional stream data retaining unit for retaining data compressed by the multi-dimensional stream data compressing unit in a multi-hierarchical structure, wherein the transmitter selects data retained in a certain hierarchical structure from the data retained in the multi-hierarchical structure, in accordance with a state of a transmission path through which the multi-dimensional stream data is to be transmitted and a reproduction speed at which a receiver receiving the multi-dimensional stream data reproduces the multi-dimensional stream data, and transmits the selected data, and wherein the transmitter selects data at a hierarchy level, at which a reproducible data amount is the largest, from the data retained in the multi-hierarchical structure, in accordance with a state of a transmission path through which the multi-dimensional stream data is to be transmitted, and a reproduction speed at which the receiver receiving the multi-dimensional stream data reproduces the multi-dimensional stream data.

2. A transmitting method comprising a multi-dimensional stream data transmitting step of transmitting multi-dimensional stream data, a multi-dimensional stream data identifying step of classifying input data into a plurality of kinds of motion data;

a multi-dimensional stream data compressing step of compressing the plurality of kinds of motion data on a block basis, and a multi-dimensional stream data retaining step of retaining data compressed by the multi-dimensional stream data compressing unit in a multi-hierarchical structure, wherein the transmitting method selects data retained in a certain hierarchical structure from the data retained in the multi-hierarchical structure, in accordance with a state of a transmission path through which the multi-dimensional stream data is to be transmitted and a reproduction speed for reproducing the multi-dimensional stream data, and transmits the selected data, and wherein data at a hierarchy level, at which a reproducible data amount is the largest, is selected from the data retained in the multi-hierarchical structure, in accordance with a state of a transmission path through which the multi-dimensional stream data is to be transmitted, and a reproduction speed at which the receiver receiving the multi-dimensional stream data reproduces the multi-dimensional stream data.

3. A transmitter for transmitting and/or converting an operational data of a three-dimensional CG character having at least one joint into a stream data, the operational data having at least one of a dimensional data to be selected from dimensional data of a vector representing the position of the three-dimensional CG character, dimensional data of a directional vector representing a posture at the position of the three-dimensional CG character, dimensional data of a vector of rotary axis of the at least one joint and rotational angle around the vector of the rotary axis thereof, and dimensional data of rotational angle disposed around a local coordinate axis of the at least one joint; the transmitter comprising:

an assigning means for assigning predetermined channels into the respective dimension of the operational data;

a first packet generating means for generating a first packet by making a packet information misting to the correspondence between the respective constituting elements of the three-dimensional CG character and the channel thereof;

a second packet generating means for generating a second packet by making a packet both of time information necessary to reproduce the operational data and the respective operational data of each of the constituting elements at a time relating to the time information in association with an identification data of the respective corresponding channel; and a transmitting means for transmitting the second packets in a series of time sequence alter transmitting the first packets.

4. A transmitter according to claim 3, wherein the second packet generating means includes a suppressing means for suppressing the operational data at the time of making a packet.

5. A transmitter according to claim 4, wherein the suppressing means is operated by a different process in accordance with kinds of operational data.

6. A receiver for reproducing the operational data of three dimensional CG character by receiving the stream data transmitted from the transmitter defined in claim 3, the receiver comprising:

a receiving means for receiving the first and the second packets;

a discriminating means for discriminating as to whether a received packet is the first packet or the second packet; and a reproducing means for reproducing the operational data based on the discriminating result of the discriminating means.

7. A receiver according to claim 6, wherein the reproducing means is adopted to make a judgment about the suppression of the second packet and to extend the second packet.

8. A transmitting method for transmitting and/or converting an operational data of a three-dimensional CG character having at least one joint into a stream data, the operational data having at least one of a dimensional data to be selected from dimensional data of a vector representing the position of the three-dimensional CG character, dimensional data of a directional vector representing a posture at the position of the three-dimensional CG character, dimensional data of a vector of rotary axis of the at least one joint and rotational angle around the vector of the rotary axis thereof, and dimensional data of rotational angle disposed around a local coordinate axis of the at least one joint; the method comprising the steps of:

a step of assigning predetermined channels into the respective dimension of the operational data;

a step of generating a first packet by making a packet information relating to the correspondence between the respective constituting elements of the three-dimensional CG character and the channel thereof;

a step of generating a second packet by making a packet both of time information necessary to reproduce the operational data and the respective operational data of each of the constituting elements at a time misting to the time information in association with an identification data of the respective corresponding channel; and a step of transmitting the second packets in a series of time sequence after transmitting the first packets.

9. A transmitting method according to claim 8, wherein the second packet generating step includes a step of suppressing the operational data at the time of making a packet.

10. A transmitting method according to claim 9, wherein the suppressing step is performed by different process in accordance with kinds of operational data.

11. A receiving method for reproducing the operational data of three dimensional CG character by receiving the stream data transmitted by the transmitting method of claim 8, the method comprising the steps of:

a step of receiving the first and the second packets;

a step of discriminating as to whether a received packet is the first packet or the second packet; and a step of reproducing the operational data based on the discriminating result of the discriminating means.

12. A receiving method according to claim 11, wherein the reproducing step is applied to make a judgment about the suppression of the second packet, and to extend the second packet.

* * * * *

UNITED STATES PATENT AND TRADEMARK OFFICE
CERTIFICATE OF CORRECTION

PATENT NO. : 6,757,432 B2
DATED : June 29, 2004
INVENTOR(S) : Toshiki Hijiri et al.

It is certified that error appears in the above-identified patent and that said Letters Patent is hereby corrected as shown below:

Column 23,
Line 13, "misting" should read -- relating --;
Line 16, "alter" should read -- after --; and
Line 49, "second packet" should read -- second packet, --

Column 24,
Line 25, "misting" should read -- relating --.

Signed and Sealed this

Nineteenth Day of October, 2004

JON W. DUDAS
*Director of the United States Patent and Trademark Office*